(12) United States Patent
Horan et al.

(10) Patent No.: US 8,674,225 B2
(45) Date of Patent: Mar. 18, 2014

(54) ECONOMICAL BOOSTED HIGH SPEED DATA CABLE

(76) Inventors: John Martin Horan, Blackrock (IE); Gerald Donal Murphy, Ovens (IE); David William McGowan, Rostellan (IE)

( * ) Notice: Subject to any disclaimer, the term of this patent is extended or adjusted under 35 U.S.C. 154(b) by 394 days.

(21) Appl. No.: 13/064,042

(22) Filed: Mar. 3, 2011

(65) Prior Publication Data

US 2012/0012357 A1 Jan. 19, 2012

Related U.S. Application Data

(63) Continuation-in-part of application No. 12/805,101, filed on Jul. 13, 2010.

(51) Int. Cl.
  *H02G 15/04* (2006.01)
(52) U.S. Cl.
  USPC ........................................ 174/74 R
(58) Field of Classification Search
  USPC ............ 174/28, 29, 36, 102 R, 106 R, 110 R, 174/113 R, 74 R, 78
  See application file for complete search history.

(56) References Cited

U.S. PATENT DOCUMENTS

| | | | | |
|---|---|---|---|---|
| 6,486,643 | B2 * | 11/2002 | Liu | 323/268 |
| 6,940,477 | B2 * | 9/2005 | Moon et al. | 345/87 |
| 7,118,411 | B2 * | 10/2006 | Huang et al. | 439/502 |
| 7,423,218 | B2 * | 9/2008 | Konda | 174/74 R |
| 7,762,727 | B2 * | 7/2010 | Aronson | 385/89 |
| 2003/0064625 | A1 * | 4/2003 | Ozai | 439/579 |
| 2004/0158662 | A1 * | 8/2004 | Konda et al. | 710/72 |
| 2006/0239310 | A1 * | 10/2006 | Salz | 372/29.021 |
| 2007/0164802 | A1 * | 7/2007 | Rea et al. | 327/266 |
| 2008/0106306 | A1 * | 5/2008 | Keady et al. | 327/100 |
| 2008/0106313 | A1 | 5/2008 | Keady et al. | |
| 2009/0083825 | A1 * | 3/2009 | Miller et al. | 725/151 |
| 2009/0260869 | A1 * | 10/2009 | Wang | 174/350 |
| 2010/0051318 | A1 | 3/2010 | Wang | |
| 2010/0236814 | A1 * | 9/2010 | Wang | 174/115 |

FOREIGN PATENT DOCUMENTS

| | | |
|---|---|---|
| CN | 201 170976 Y | 12/2008 |
| EP | 1434318 | 6/2004 |
| JP | 2004 119060 A | 4/2004 |

OTHER PUBLICATIONS

Deirdre Mathelin, "HDMI version 1.4 provides opportunities for active cables", Electronic Engineering Times Europe, vol. 12, No. 1, pp. 40-41,XP00 Sep. 2009.
Sanjiv Kumar, SuperSpeed USB 3.0 Specification Revolutionizes an Established Standard Nov. 2008.
Universal Serial Bus 3.0 Specification Revision 1.0 Nov. 12, 2008 Hewlett-Packard Company, Intel Corporation and others.
High-Definition Multimedia Interface (HDMI) Specification version 1.4a, dated Mar. 4, 2010.
Video Electronics Standards Association (VESA) DisplayPort Specification v1.2, dated Jan. 5, 2010.

* cited by examiner

*Primary Examiner* — William H Mayo, III
(74) *Attorney, Agent, or Firm* — Trellis IP Law Group, PC

(57) ABSTRACT

A high speed video cable carries signals according to the High-Definition Multimedia Interface (HDMI), and includes a raw cable and a boost device. Each of four high speed video signals is carried on the inner conductors of a pair of coaxial lines in the raw cable. Lower speed signals are carried on the galvanically or capacitively coupled shields of a pair of coaxial lines.

18 Claims, 27 Drawing Sheets

ECONOMICAL BOOSTED HIGH SPEED DATA CABLE

CROSS REFERENCE TO RELATED APPLICATIONS

This application is Continuation-in-Part of the U.S. application Ser. No. 12/805,101 filed on Jul. 13, 2010, the entire contents of which are incorporated herein by reference.

FIELD OF THE INVENTION

The present invention relates to the construction of boosted high speed data cables, which carry high speed signal lines.

BACKGROUND OF THE INVENTION

The distribution of television signals has increasingly become based on digital methods and digitally encoded forms of video and audio signals. At the same time, higher resolution (high definition TV) has become available in the market place, commensurate with larger and higher definition displays. To meet the requirement of interconnecting such high definition displays with digital signal sources such as Digital Versatile Disc (DVD) players and receivers/decoders for digital satellite and digital cable distribution of video material, a digital interface standard has evolved, known as the High-Definition Multimedia Interface (HDMI). A detailed specification for HDMI can be obtained from the "hdmi.org" website. The HDMI specification currently available and used in this application is HDMI specification version 1.4a dated Mar. 4, 2010, which is incorporated herein by reference.

HDMI cables of various construction may be used for transmitting high speed digital signals from digital signal sources, including, but not limited to, the examples listed above, to digital displays or other equipment designed to receive signals according to the HDMI specification.

A HDMI cable carries not only four high speed differential signals which are shielded, but also a number of lower speed signals, power and ground, the whole being further shielded by an outer braid. The resulting complex cable configuration with numerous wires, some of which are individually shielded, is expensive to manufacture and terminate.

Another standard for connecting video source to a video sink, is published as the DisplayPort standard by the Video Electronics Standards Association (VESA). The latest DisplayPort specification used in this application is DisplayPort v1.2, dated Jan. 5, 2010 which is submitted in the Information Disclosure Statement for this application. The DisplayPort standard specifies a high speed data cable that is intended primarily to be used between a computer and its display monitor or a home-theater system. A cable meeting the DisplayPort standard is very similar to an HDMI cable, the main difference being in the respective physical connectors.

Therefore there is a need in the industry for developing an improved and easier to manufacture high speed cable, which would avoid or mitigate the shortcomings of the prior art and provides significant economies at the same time.

SUMMARY OF THE INVENTION

Therefore there is an object of the invention to provide an improved boosted high speed data cable using a reduced number of wire elements, which would be more economical and have superior properties over existing prior art cables.

According to one aspect of the invention, there is provided a cable for carrying a high speed differential digital data signals and one or more auxiliary signals between a source device and a sink device according to a cable specification, the cable comprising:
a raw cable, comprising a split dual shielded cable element, comprising two shielded conductors, each of said two shielded conductors being enclosed in an individual shield;
individual shields of the shielded conductors are designated for carrying respective auxiliary signals; and
the shielded conductors of the split dual shielded cable element are designated for carrying the high speed differential digital data signal.

The cable further comprises a coupling capacitor for capacitively coupling the individual shields of the split dual shielded cable element. Conveniently, capacitance of the coupling capacitor is chosen to be low enough not to cause cross talk between low speed auxiliary signals, but high enough to preserve transmission characteristics of the dual shielded cable element with respect of the high speed differential signal.

The cable may further comprise a boost device for boosting the high speed differential digital data signals.

In the cable described above, the raw cable further comprises a dual shielded cable element, comprising two shielded conductors and a common shield;
wherein:
the two shielded conductors of the dual shielded cable elements are designated for carrying a respective high speed differential digital data signal; and
the common shield of the shielded conductors is designated for carrying an additional auxiliary signals.

The cable further comprises a first circuit carrier for connecting the raw cable to the source device, and a second circuit carrier for connecting the raw cable to the sink device.

The first circuit carrier comprises:
terminals for connecting the high speed differential digital data signal from the source device to respective shielded conductors of the split dual shielded cable element; and
terminals for connecting respective auxiliary signals from the source device to the individual shields respectively; and the second circuit carrier comprises:
terminals for connecting the high speed differential digital data signals from respective shielded conductors of the split dual shielded cable element to the sink device; and
terminals for connecting respective auxiliary signals from the individual shields to the sink device.

In an embodiment of the invention, capacitance of the coupling capacitor is about 1 nF.

The cable of the embodiments of the invention has been designed to satisfy the cable specification, which is a High-Definition Multimedia Interface (HDMI) standard.

Conveniently, the individual shields of the split dual shielded cable element are designated for carrying Power and Ground auxiliary signals. Alternatively, the individual shields of the split dual shielded cable element may be designated for carrying a Hot Plug Detect (HPD) auxiliary signal and CEC (Consumer Electronics Control) auxiliary signal.

In an embodiment of the invention, the raw cable comprises only two split dual shielded cable elements, and two dual shielded cable elements, each dual shielded element comprising two shielded conductors and a common shield.

Alternatively, the cable may be designed to satisfy the cable specification, which is a DisplayPort standard.

In an embodiment of the invention, said split dual shielded cable element is a split dual coaxial element, comprising two coaxial lines whose shields are capacitively coupled to one another, and each coaxial line enclosing one shielded conductor; and the dual shielded cable element is a dual coaxial element, comprising two coaxial lines whose shields are joined, and said shields of each coaxial line enclosing a respective shielded conductor.

According to yet another aspect of the invention, there is provided a method for transmitting a high speed differential digital data signal and one or more auxiliary signals between a source device and a sink device according to a cable specification over a cable extending between the source device and the sink device, the method comprising:

carrying the high speed differential digital data signal over the cable in two shielded conductors of a split shielded cable element, each of the two shielded conductors having an individual shield; and carrying said one or more auxiliary signals on respective individual shields of the shielded conductors.

The method further comprises a step of capacitively coupling the individual shields of the split dual shielded cable element.

The method further comprises carrying yet another auxiliary signal on a common shield of a dual shielded cable element comprising two shielded conductors and the common shield.

In the method described above, the carrying is performed according to the cable specification, which is a High Definition Multimedia Interface (HDMI) standard or a DisplayPort standard.

Thus, a lower cost boosted high speed data cable and a method of transmitting digital signals over the cable have been provided.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

Embodiments of the present invention describe a boosted high speed cable comprising shielded high speed signal lines and carrying other signals of lower speed as well as power and ground, in which the shields of the shielded high speed signal lines are used in carrying the lower speed signals and power and ground.

The inherent characteristics and manufacturing imperfections of high-speed differential signaling cables such as may be used to carry HDMI signals have an adverse effect on the high-speed signals carried by the cable. To mitigate these effects, various boosted high speed data cables have been proposed by the industry. For example, in the previously filed US application of the same assignee, Ser. No. 11/826,713 filed on Jul. 18, 2007, a boost device is embedded in the cable, the entire contents of the patent application being incorporated herein by reference.

The inventors have discovered that the boost device may not only be used to equalize and boost the signal, as described in the U.S. application Ser. No. 11/826,713 cited above, but may also be used to advantage in other ways, specifically to allow the individual shields of the differential high speed signals to be used for carrying other signals.

In a cable of the prior art, the shields are all tied to ground in an effort to reduce electro-magnetic interference (EMI). In a cable according to any of the embodiments of the invention, EMI shielding is still provided, but instead of tying the shields of the high-speed HDMI signals to ground, the lower speed signals as well as power and ground, are sent over the shields.

Figure 1A:
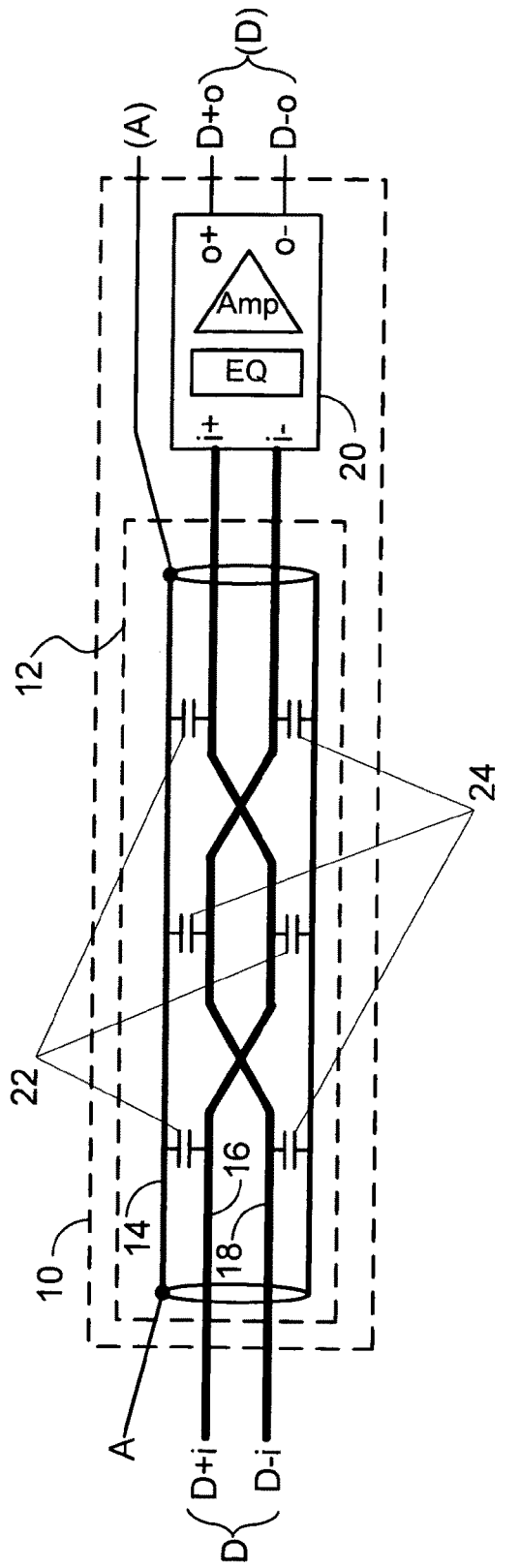
FIG. 1A shows a simplified boosted cable 10 to illustrate the principle of transmitting a single-ended signal and a differential signal over a shielded cable comprising a dual shielded cable element 12, which is a Shielded Twisted Pair (STP), and a boost circuit 20.

FIG. 1A shows a simplified boosted cable 10 to illustrate the principle of transmitting a single-ended signal and a differential signal over a shielded cable. The simplified boosted cable 10 comprises a dual shielded cable element 12 which is a Shielded Twisted Pair (STP) including a single shield 14 enclosing first and second signal wires (two shielded conductors) 16 and 18 respectively, and a boost circuit 20 having inputs i+ and i− and outputs o+ and o−. The inputs i+ and i− of the boost circuit 20 are a differential input pair and the outputs o+ and o− of the boost circuit 20 are a differential output pair.

The simplified boosted cable 10 receives a single-ended signal "A" and a differential signal "D" comprising polarities D+i and D−i at the input of the simplified boosted cable 10, and is designed to deliver these signals substantially undistorted at its output. The boost circuit 20 includes an equalizer circuit (EQ) and a differential amplifier (Amp) for equalizing and boosting the differential signal "D".

The signal wires 16 and 18 carry the differential signal "D", comprising polarities D+i and D−i respectively from the input of the simplified boosted cable 10 through the dual shielded cable element 12 to the inputs i+ and i− of the boost circuit 20. The outputs o+ and o− of the boost circuit 20 deliver a processed differential signal comprising polarities D+o and D−o to the output of the simplified boosted cable 10, which represent the differential signal "D".

The single shield 14 carries a single-ended signal "A" directly from the input of the simplified boosted cable 10 to its output.

The processing functions of the boost circuit 20 include: receiving the differential input signal; removing any common mode component of the differential input signal; equalizing the signal to compensate for signal impairments introduced by the dual shielded cable element 12; and outputting a boosted version of the equalized differential signal "D".

To summarize, the differential signal is a high-speed data signal "D", which may benefit from equalization and boosting while the single-ended signal "A" may be a ground signal, a power supply signal, or any low speed signal which does not require equalization or boosting.

Along the length of the STP raw cable 12, a small fraction of the single-ended signal "A" is unavoidably coupled as undesirable noise through distributed capacitances 22 and 24 into the signal wires 16 and 18 respectively, thus affecting the differential signal "D". Given that, by the construction of the dual shielded cable element 12, the capacitances 22 and 24 are essentially equal, the polarities D+i and D−i respectively are equally affected, and the coupled noise manifests itself as common mode noise.

At the receiving end of the dual shielded cable element 12, the boost circuit 20 receiving the differential signal "D", provides sufficient common-mode rejection such that the common mode noise is not converted into a differential signal. The outputs o+ and o− of the boost circuit 20, that produces a boosted signal, is then a clean differential signal which is delivered at the output of the simplified boosted cable 10.

Figure 1B:
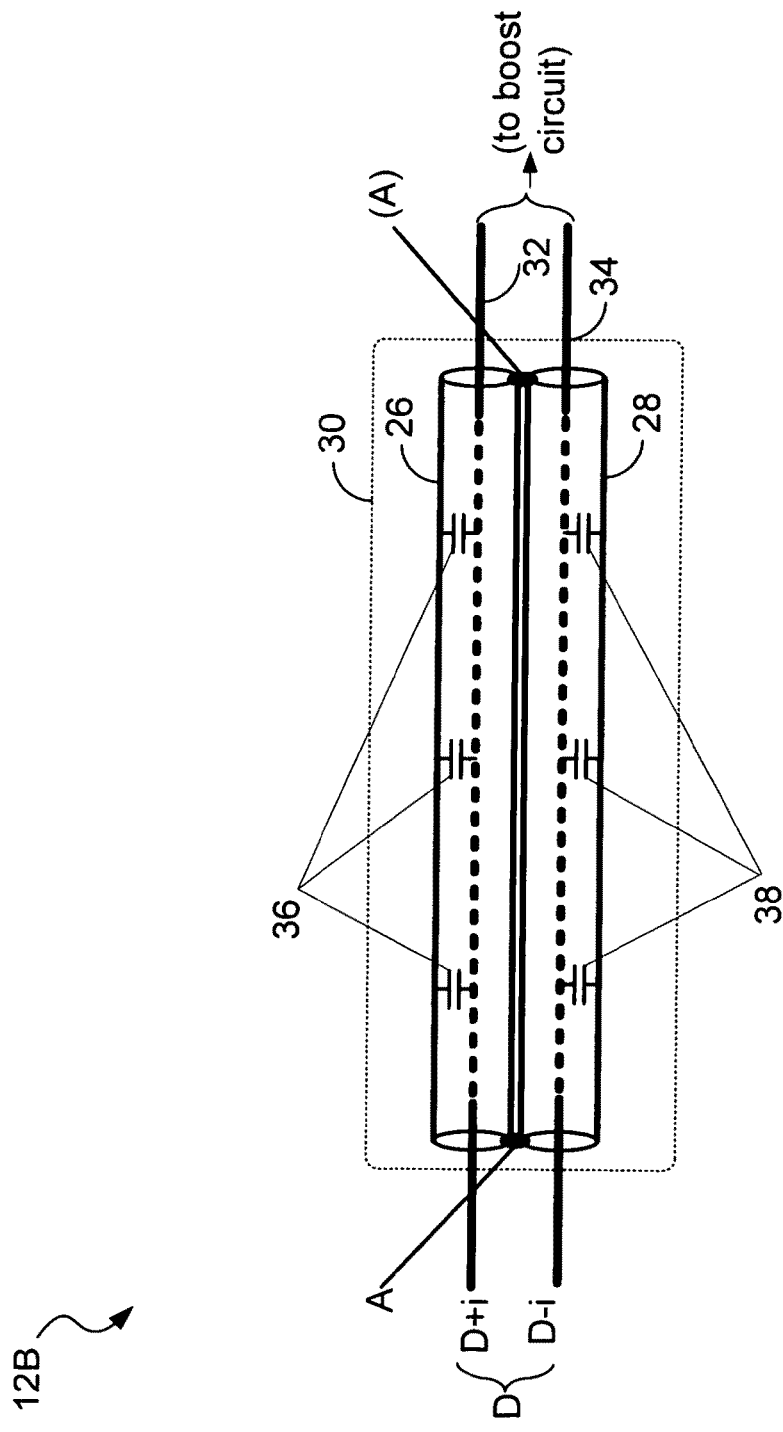
FIG. 1B shows a dual coaxial element 12B that may be used instead of the dual shielded cable element 12 of FIG. 1A.

Alternatively, as shown in FIG. 1B, a dual coaxial element 12B may be used instead of the dual shielded cable element 12. The dual coaxial element 12B is comprised of two coaxial lines 26 and 28 forming a coax pair 30 whose outer conductors (shields) are joined together, the joined shields providing the connection for the single-ended signal "A". The coaxial line 26 carries the polarity D+i of the differential signal "D" on its inner conductor 32, while the coaxial line 28 carries the polarity D−i of the differential signal "D" on its inner conductor 34. Coupling between the single-ended signal "A" and the inner conductors 32 and 34 which are also referred to as shielded conductors, through distributed capacitances 36 and 38 respectively is analogous to the case of the dual shielded cable element 12, resulting in common mode noise only which is rejected by the boost circuit 20.

In the following figures, various boosted HDMI cable configurations are shown which are embodiments of the invention that are based on the cable elements described in FIGS. 1A and 1B.

Figure 2:
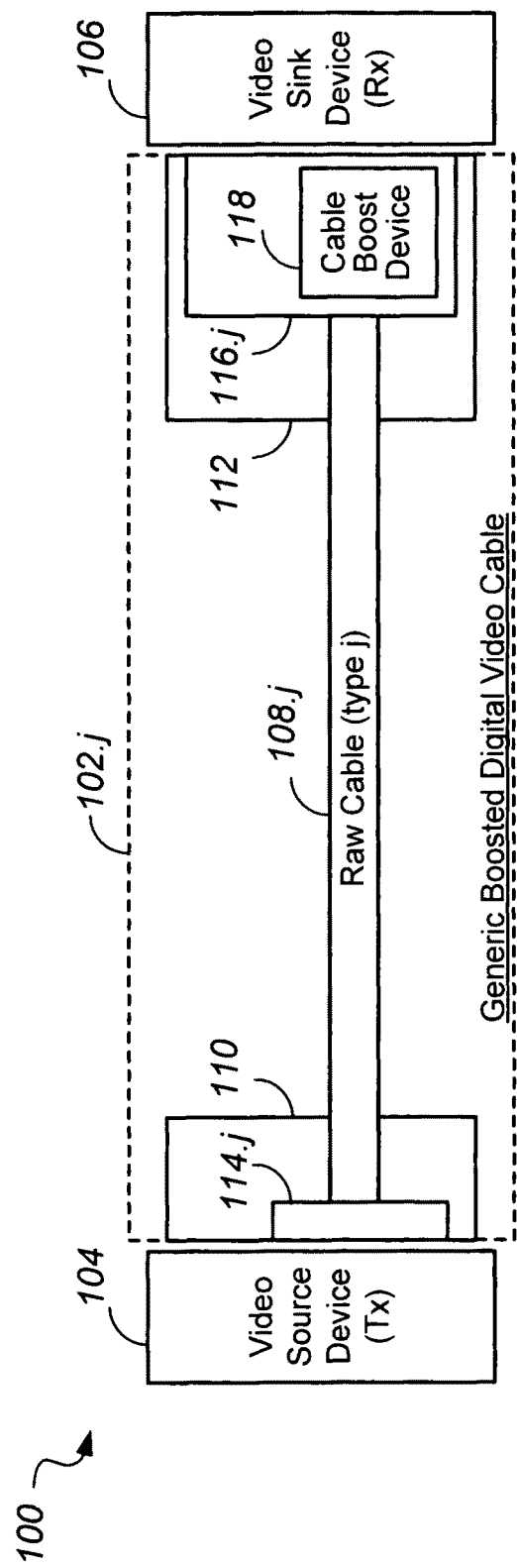
FIG. 2 shows a configuration 100 of a generic Boosted Digital Video Cable 102.j which may be any of a number of types according to embodiments of the invention, interconnecting a Video Source Device (Tx) 104 and a Video Sink Device (Rx) 106.

FIG. 2 shows a configuration 100 of a generic Boosted Digital Video Cable 102.j which may be any of a number of types to be described below, connecting a Video Source Device (Tx) 104 to a Video Sink Device (Rx) 106. The Boosted Digital Video Cable 102.j comprises a Raw Cable 108.j, and Input and Output Connectors 110 and 112 respectively.

The Input Connector 110 connects the Raw Cable 108.j to the Video Source Device (Tx) 104, and comprises an Input Paddle Board 114.j for providing connectivity between signals from the Video Source Device (Tx) 104 and facilities (wires, shields) of the Raw Cable 108.j.

The Raw Cable 108.j includes dual shielded cable elements and optionally a single coaxial line, for carrying the video signals which are high speed differential data signals as well as auxiliary signals as defined by cable specifications, power and ground being included among the auxiliary signals. Alternatively, the raw cable may include dual shielded cable elements only, i.e. excluding any other wires between the video source device and the video sink device. A dual shielded cable element may be a shielded twisted pair (STP), or a dual coaxial element comprising two coaxial lines whose shields are joined, each coaxial line enclosing one shielded conductor.

Various embodiments of the Raw Cable 108.j are described below, covering HDMI and DisplayPort specifications and using either coaxial or shielded twisted pair (STP) technology.

The Output Connector 112 connects the Raw Cable 108 to the Video Sink Device (Rx) 106, and comprises an Output Paddle Board 116.j including a Cable Boost Device 118, for providing connectivity between the facilities (wires, shields) of the Raw Cable 108.j and the Video Sink Device (Rx) 106. The Cable Boost Device 118 is connected between some of the wires of the cable and the input of the Video Sink Device (Rx) 106. The Cable Boost Device 118 includes a number of Boost Circuits 20, one Boost Circuit 20 for terminating the dual shielded cable elements of the Raw Cable 108 which carry the high speed differential digital data signals that arrive from the Video Source Device (Tx) 104 over the Raw Cable 108.

The Input Paddle Board 114.j and the Output Paddle Board 116.j constitute first and second circuit carriers which are conveniently constructed as small printed circuit boards (PCB) and may be configured to provide the mechanical support for connector contacts according to the cable specification, for example according to the HDMI or DisplayPort standards.

Figure 3:
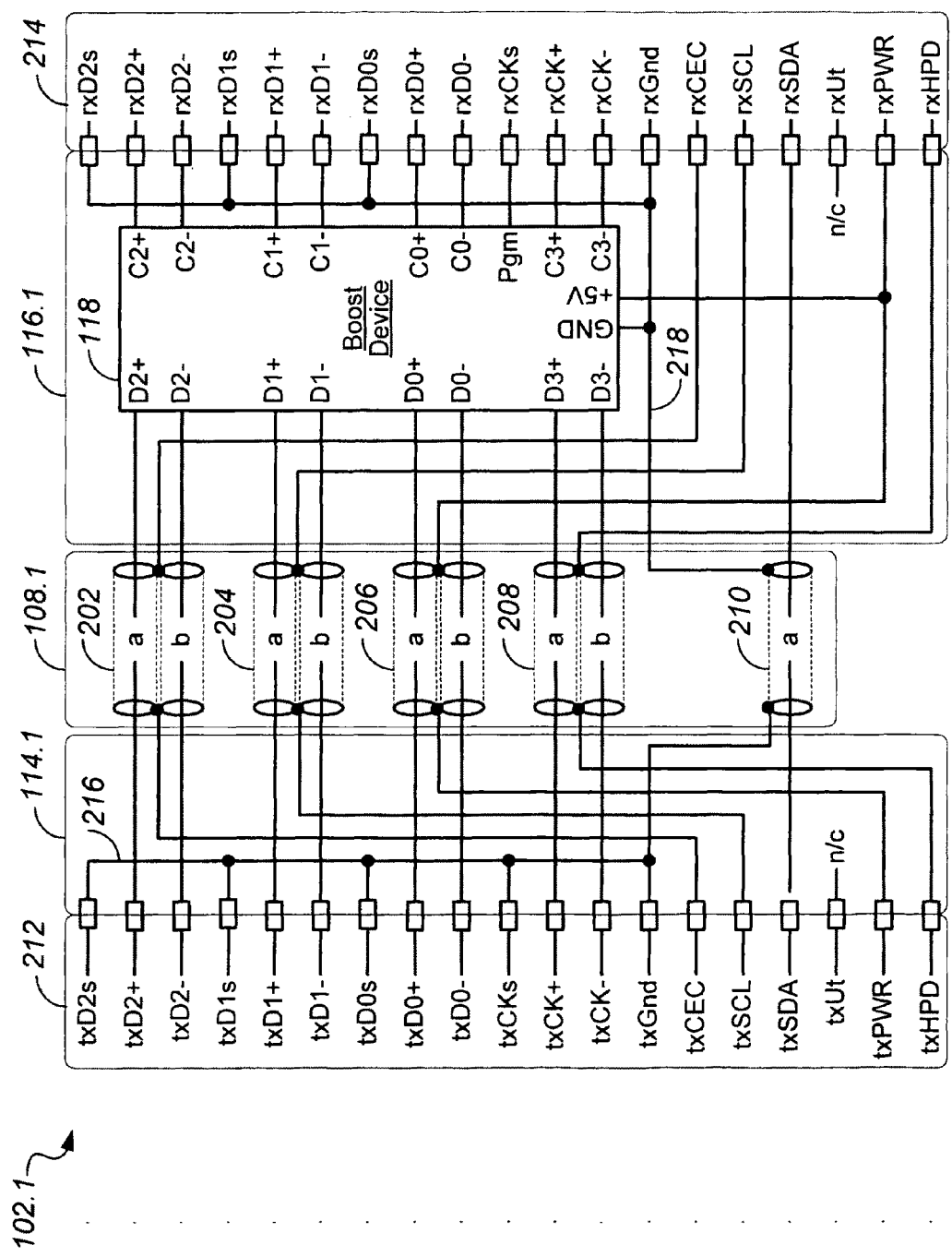
FIG. 3 shows a Basic Coax HDMI Cable 102.1 based on coax technology according to a first embodiment of the invention.

FIG. 3 shows a Basic Coax HDMI Cable 102.1 based on coax technology, including a circuit carrier in the form of a first Input Paddle Board 114.1, a first Raw Cable 108.1, and a first Output Paddle Board 116.1 according to an embodiment of the invention. The first Raw Cable 108.1 includes a total of nine individual coaxial lines arranged as four dual shielded cable elements, that is coax pairs 202, 204, 206 and 208, and a single coaxial line 210. Each coax pair 202 to 208 comprises two coaxial lines with inner signal wires labeled as "a" and "b", and two shields which are joined together such that the joined shields form a single conductive path. Thus, each of the coax pairs 202 to 208 provides three electrical connections, i.e. one differential connection (wires "a" and "b") and one single-ended connection (the joined shields), as described earlier (see FIG. 1B). The single coaxial line 210 provides only two conductive paths, the inner signal wire "a" and the shield.

The Cable Boost Device 118 is comprised within the first Output Paddle Board 116.1, and has high speed differential signal inputs D2 (polarities D2+, D2−), D1 (D1+, D1−), D0 (D0+, D0−), and D3 (D3+, D3−) and corresponding boosted outputs C2 (polarities C2+, C2−), C1 (C1+, C1−), C0 (C0+, C0−), and C3 (C3+, C3−). In addition, the Cable Boost Device 118 has ground and power inputs (GND, +5V), and a programming input (Pgm). The programming input is used to program parameters of the Cable Boost Device 118 in manufacturing. In normal operation this input is not active, and is effectively grounded (connected to GND) through a low resistance within the Cable Boost Device 118.

HDMI signals may be classified as either high speed differential data signals or auxiliary signals. The high speed differential data signals include Transition Minimized Differential Signaling (TMDS) Data 0, TMDS Data 1, TMDS Data 2, and TMDS Clock. The auxiliary signals are the following single ended signals: Consumer Electronics Control (CEC), Serial Clock (SCL), Serial Data (SDA), Utility, Hot Plug Detect (HPD), and Serial Data (SDA). A +5V Power and a Digital Data Channel (DDC)/CEC Ground connection is also provided through the cable. The +5V Power and the DDC/CEC Ground connections are included in the auxiliary signals for simplicity here.

The signals from the Video Source Device (Tx) 104 are connected to terminals in an Input Connection Field 212 of the Basic Coax HDMI Cable 102.1, and recovered at the opposite end of the cable with terminals of an Output Connection Field 214 for transmission to the Video Sink Device (Rx) 106. Standard HDMI signal names and corresponding terminal labels of the Input and Output Connection Fields 212 and 214 are listed in Table 1, which shows the preferred connection arrangement, or signal designations, for the Basic Coax HDMI Cable 102.1.

Referring to FIG. 3 and Table 1, each of the four HDMI high speed differential data signals TMDS Data 0, TMDS Data 1, TMDS Data 2, and TMDS Clock, are routed through the Basic Coax HDMI Cable 102.1 as described in the following:

The TMDS Data 2 differential signal, comprising TMDS Data2+ and TMDS Data2− is:
   connected from the Video Source Device (Tx) 104 to txD2+ and txD2− terminals in the Input Connection Field 212;
   routed in the first Input Paddle Board 114.1 to the input of the raw cable, namely the inner signal wires "a" and "b" of the coax pair 202;
   routed through the inner signal wires "a" and "b" of the coax pair 202 of the first Raw Cable 108.1;
   coupled from the end of the first Raw Cable 108.1 to D2+ and D2− inputs of the Cable Boost Device 118 in the first Output Paddle Board 116.1; and
   coupled from the C2+ and C2− outputs of the Cable Boost Device 118 to rxD2+ and rxD2− terminals in the Output Connection Field 214.

The other three HDMI high speed differential data signals (TMDS Data 0, TMDS Data 1, and TMDS Clock) are similarly connected, see Table 1.

The shields of the HDMI high speed data signals (TMDS Data0 Shield, TMDS Data1 Shield, TMDS Data2 Shield, and TMDS Clock Shield), as well as the DDC/CEC Ground signal from the Video Source Device (Tx) 104 are connected to terminals txD0s, txD1s, txD2s, txCKs, and txGnd of the Input Connection Field 212, and tied to an input common ground node 216 in the first Input Paddle Board 114.1 whence the input common ground node 216 is connected to the shield of the single coaxial line 210.

In the first Output Paddle Board 116.1, the shield of the single coaxial line 210 is connected to an output common ground node 218 which is further connected to the ground (GND) input of the Cable Boost Device 118, and to shield and ground connections of the Video Sink Device (Rx) 106, namely terminals rxD0s, rxD1s, rxD2s, and rxGnd. The TMDS Clock Shield of the Video Sink Device (Rx) 106 is connected through a terminal rxCKs to the programming (Pgm) input of the Cable Boost Device 118, and so is indirectly grounded through the small resistance within the Cable Boost Device 118. This allows the Cable Boost Device 118 to be programmed from the HDMI connector after the boosted cable is assembled without requiring any additional wire to access it. Alternatively, the rxCKs terminal may be grounded directly at the output common ground node 218 along with the other shield connections.

The remaining auxiliary signals (CEC, SCL, SDA, Utility, +5V Power, and HPD), are connected in the first Input Paddle Board 114.1 to terminals txCEC, txSCL, txSDA, txUt, txPWR, and txHPD respectively. In the first Output Paddle Board 116.1, they are connected to terminals rxCEC, rxSCL, rxSDA, rxUt, rxPWR, and rxHPD respectively. Compared to the HDMI high speed data signals which are boosted by the Boost Device 118, these auxiliary HDMI signals are at a lower speed, bypass the Cable Boost Device 118, and may be carried on the inner wires or over the shields of the coaxial lines as may be convenient. The "Utility" signal in this case is unused. However if it is necessary to include it, it may be carried on an additional inner wire or over the shield of a coaxial wire as may be convenient.

While four of the auxiliary signals CEC, SCL, +5V Power and HPD are carried over the shields of the coax pairs 202 to 208, another auxiliary signal (DDC/CEC Ground), to which also the shields of the TMDS signals are tied) is carried over the shield of single coaxial line 210, and yet another auxiliary signal (SDA), is carried over the inner signal wire "a" of the single coaxial line 210.

In the Basic Coax HDMI Cable 102.1, these remaining HDMI signals (except the Utility signal) are carried over the cable as follows:

CEC from the terminal txCEC, over the combined shields of the coax pair 202, to the terminal rxCEC;

SCL from the terminal txSCL, over the combined shields of the coax pair 204, to the terminal rxSCL;

SDA from the terminal txSDA, over the inner wire "a" of the coax 210, to the terminal rxSDA;

+5V Power from the terminal txPWR, over the combined shields of the coax pair 206, to the terminal rxPWR; and Hot Plug Detect from the terminal txHPD, over the combined shields of the coax pair 208, to the terminal rxHPD.

In the first Output Paddle Board 116.1 the +5V Power is also connected to the power input (+5V) of the Boost Device 218.

TABLE 1

Preferred Signal Routing in Basic Coax HDMI Cable 102.1

| HDMI Signal Name | Input Connection 212 | Raw Cable 108.1 | Boost Device Input | Boost Device Output | Output Connection 214 |
|---|---|---|---|---|---|
| TMDS Data2 Shield | txD2s | 210.shield | --> | --> | rxD2s |
| TMDS Data2+ | txD2+ | 202.a | D2+ | C2+ | rxD2+ |
| TMDS Data2− | txD2− | 202.b | D2− | C2− | rxD2− |
| TMDS Data1 Shield | txD1s | 210.shield | --> | --> | rxD1s |
| TMDS Data1+ | txD1+ | 204.a | D1+ | C1+ | rxD1+ |
| TMDS Data1− | txD1− | 204.b | D1− | C1− | rxD1− |
| TMDS Data0 Shield | txD0s | 210.shield | --> | --> | rxD0s |
| TMDS Data0+ | txD0+ | 206.a | D0+ | C0+ | rxD0+ |
| TMDS Data0− | txD0− | 206.b | D0− | C0− | rxD0− |
| TMDS Clock Shield | txCKs | 210.shield | — | — | — |
|  |  |  | Pgm | --> | rxCKs |
| TMDS Clock+ | txCK+ | 208.a | D3+ | C3+ | rxCK+ |
| TMDS Clock− | txCK− | 208.b | D3− | C3− | rxCK− |
| DDC/CEC Ground | txGnd | 210.shield | GND | --> | rxGnd |
| CEC | txCEC | 202.shield | --> | --> | rxCEC |
| SCL | txSCL | 204.shield | --> | --> | rxSCL |
| SDA | txSDA | 210 | --> | --> | rxSDA |
| Utility | txUt | n/c | — | — | rxUt |
| +5 V Power | txPWR | 206.shield | +5 V | --> | rxPWR |
| Hot Plug Detect | txHPD | 208.shield | --> | --> | rxHPD |

Figure 4:
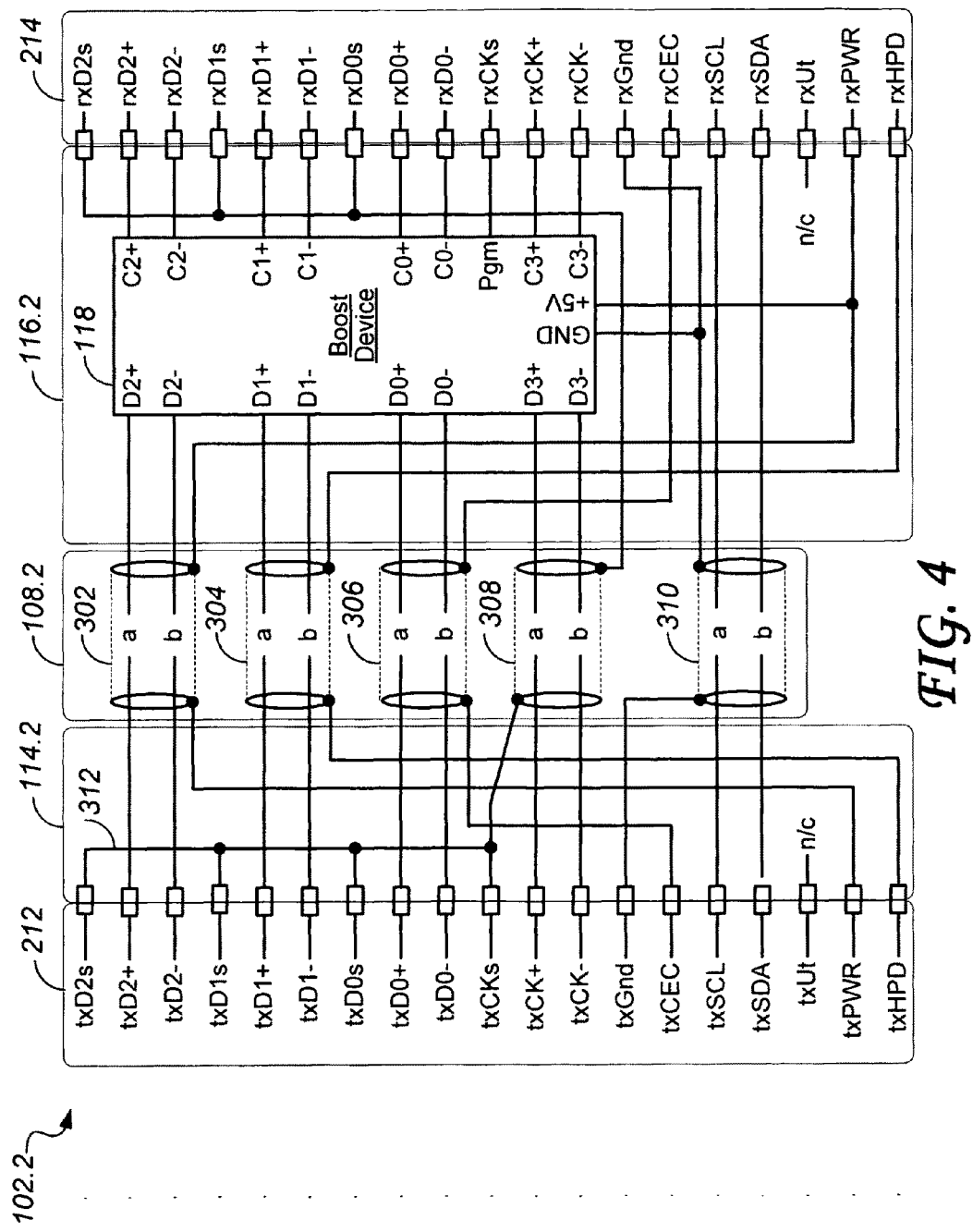
FIG. 4 shows a Basic STP HDMI Cable 102.2 based on Shielded Twisted Pair (STP) technology according to a second embodiment of the invention.

FIG. 4 shows a Basic STP HDMI Cable 102.2 based on Shielded Twisted Pair (STP) technology, including a second Input Paddle Board 114.2, a second Raw Cable 108.2, and a second Output Paddle Board 116.2 according to another embodiment of the invention.

The Input and Output Connection Fields 212 and 214, including the respective terminals remain unchanged from the Basic Coax HDMI Cable 102.2. The second Raw Cable 108.2 comprises five Shielded Twisted Pairs (STPs) 302, 304, 306, 308, and 310, each comprising a shield and two signal wires "a" and "b" as described in FIG. 1A. The allocation of the standard HDMI signals to connections through the second Raw Cable 108.2 is provided by configurations of the second Input and Output Paddle Boards 114.2 and 116.2 respectively.

The STPs 302, 304, 306, 308, and 310 of the second Raw Cable 108.2 provide 15 (3×5) distinct conductive paths, compared to the 14 paths (3×4+1) of the first Raw Cable 108.1. Hence an additional path is available which is advantageously used in a modification of the signal assignments. This is illustrated in FIG. 4 as well as in Table 2 which lists the preferred arrangement for the Basic STP HDMI Cable 102.2.

Because of the additional line available in the second Raw Cable 108.2, compared to the first Raw Cable 108.1, it is possible to use a shield connection (a common node 312 connected to the shield of the STP 308) to connect the shields of all high speed signals (D0, D1, D2, and CK), and use a separate shield connection (the shield of the STP 310) for the ground connection.

The preferred assignments shown in Tables 1 and 2 are to some extent arbitrary, and may be adapted to best utilize the space on the paddle boards and the configurations of the respective connectors.

TABLE 2

Preferred Signal Routing in Basic STP HDMI Cable 102.2

| HDMI Signal Name | Input Connection 212 | Raw Cable 108.2 | Boost Device Input | Boost Device Output | Output Connection 214 |
|---|---|---|---|---|---|
| TMDS Data2 Shield | txD2s | 308.shield | --> | --> | rxD2s |
| TMDS Data2+ | txD2+ | 302.a | D2+ | C2+ | rxD2+ |
| TMDS Data2− | txD2− | 302.b | D2− | C2− | rxD2− |
| TMDS Data1 Shield | txD1s | 308.shield | --> | --> | rxD1s |
| TMDS Data1+ | txD1+ | 304.a | D1+ | C1+ | rxD1+ |
| TMDS Data1− | txD1− | 304.b | D1− | C1− | rxD1− |
| TMDS Data0 Shield | txD0s | 308.shield | --> | --> | rxD0s |
| TMDS Data0+ | txD0+ | 306.a | D0+ | C0+ | rxD0+ |
| TMDS Data0− | txD0− | 306.b | D0− | C0− | rxD0− |
| TMDS Clock Shield | txCKs | 308.shield | — | — | — |
|  |  |  | Pgm | --> | rxCKs |
| TMDS Clock+ | txCK+ | 308.a | D3+ | C3+ | rxCK+ |
| TMDS Clock− | txCK− | 308.b | D3− | C3− | rxCK− |
| DDC/CEC Ground | txGnd | 310.shield | GND | --> | rxGnd |
| CEC | txCEC | 306.shield | --> | --> | rxCEC |
| SCL | txSCL | 310 | --> | --> | rxSCL |
| SDA | txSDA | 310.b | --> | --> | rxSDA |
| Utility | txUt | n/c | — | — | rxUt |
| +5 V Power | txPWR | 302.shield | +5 V | --> | rxPWR |
| Hot Plug Detect | txHPD | 304.shield | --> | --> | rxHPD |

In this embodiment of the invention, the raw cable includes STPs only, i.e. excluding any other wires between the video source device and the video sink device.

HEAC Capability

In a Supplement 2 to the HDMI specification version 1.4. dated Jun. 5, 2009 cited above, a "HDMI Ethernet and Audio Return Channel" (HEAC) is specified. The HEAC channel is carried in a HEAC-capable HDMI cable as a differential data signal, i.e. negative and positive polarity signals HEAC− and a HEAC+ respectively, which replace the Hot Plug Detect (HPD) signal and the previously unused "Utility" signal respectively of the standard HDMI signal set. The HEAC channel is a passive channel which does not require boosting by the Cable Boost Device 118. However, it does require careful control of its impedance and should therefore be enclosed in a shield, either by running each polarity in a coaxial line, or both polarities over a shielded twisted pair (STP). Accordingly, only modified connectivity (adding the HEAC channel, with controlled impedance lines, replacing HPD and "Utility" signals) in the paddle boards and in the raw cable are required to convert the basic HDMI Cables (102.1 and 102.2) to accommodate the HEAC channel.

Figure 5:
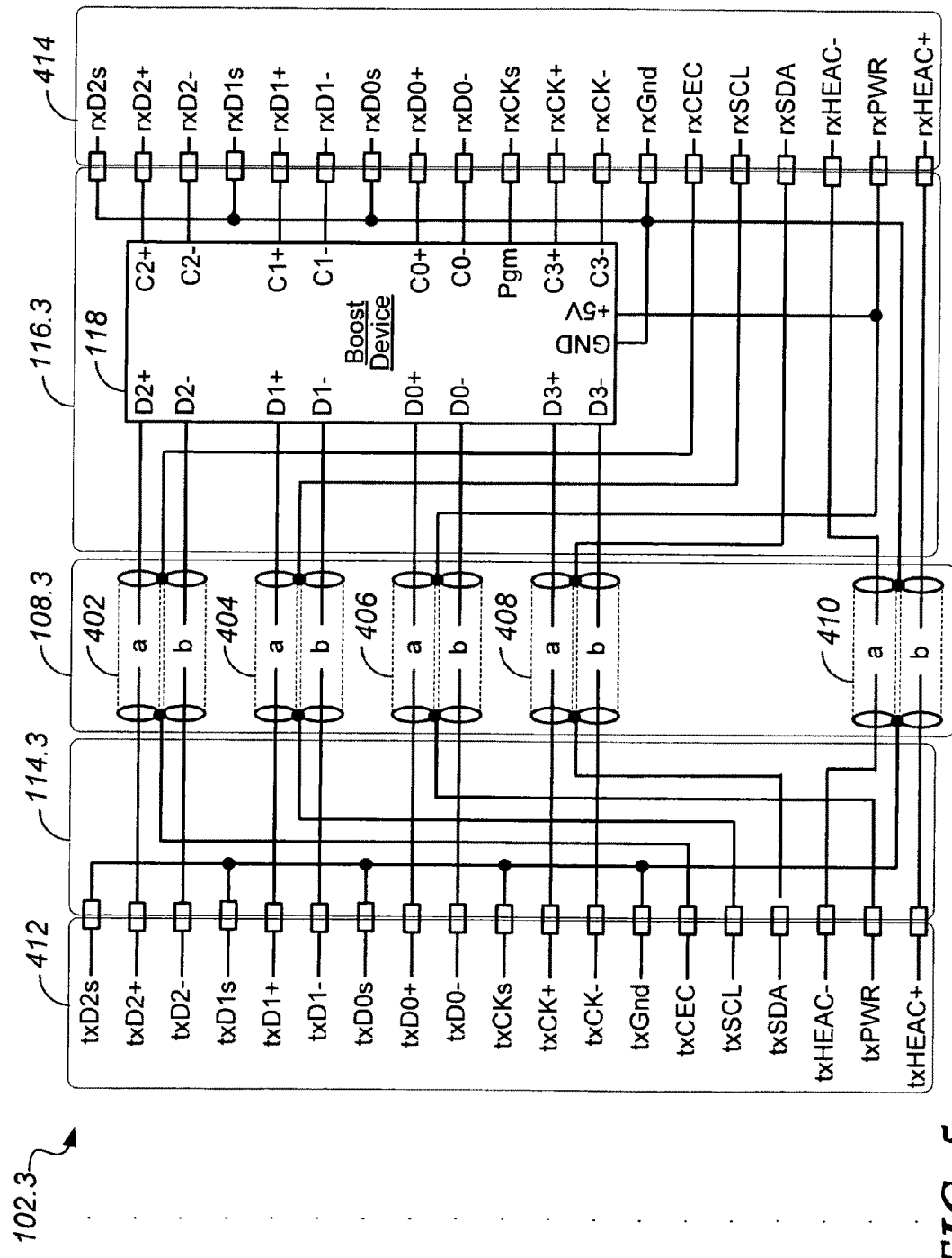
FIG. 5 shows a HEAC-Capable Coax HDMI Cable 102.3 based on coax technology according to a third embodiment of the invention.

FIG. 5 shows a HEAC-Capable Coax HDMI Cable 102.3 based on coax technology, and capable of carrying an HEAC channel: including a third Input Paddle Board 114.3, a third Raw Cable 108.3, and a third Output Paddle Board 116.3 according to yet another embodiment of the invention.

The signals of the HEAC-capable HDMI signal set from the Video Source Device (Tx) 104, are connected to a HEAC-capable Input Connection Field 412 of the HEAC-Capable Coax HDMI Cable 102.3, and recovered at the opposite end of the cable with a HEAC-capable Output Connection Field 414 for transmission to the Video Sink Device (Rx) 106. The modifications of the HEAC-capable Input and Output Fields 412 and 414 relate to name changes compared to the Input and Output Fields 212 and 214, and reflect name changes of the terminals concerned: txUt, rxUt, txHPD, and rxHPD of the Input and Output Fields 212 and 214, become txHEAC−, rxHEAC−, txHEAC+, and rxHEAC+ of the HEAC-capable Input and Output Fields 412 and 414.

The third Raw Cable 108.3 comprises a total of ten individual coaxial lines arranged in four dual shielded cable elements, that is coax pairs 402, 404, 406, and 408, for carrying high speed digital data signals, and another dual shielded cable element, that is a coax pair 410, for carrying a differential auxiliary signal. Each coax pair 402 to 410 includes two coaxial lines with inner signal wires labeled as "a" and "b", and two shields which are joined together such that the joined shields of each coax pair form a single conductive path. Thus, each of the coax pairs 402 to 410 provides three electrical connections, i.e. one differential connection (wires "a" and "b") and one single-ended connection (the joined shields), as described earlier (see FIG. 1B).

The assignments of the HDMI signals to the available cable connections in the third Input Paddle Board 114.3 and the third Output Paddle Board 116.3 are similar compared to the assignments used in the first Input and Output Paddle Boards 114.1 and 116.1 respectively. Unchanged connections are those for the differential HDMI high-speed data channels TMDS D2, D1, D0, and Clock, incoming from the Video Source Device 104, which are connected through the coax pairs 402, 404, 406, and 408 respectively to corresponding inputs of the Cable Boost Device 118.

The differential HEAC channel is connected through the coax pair 410, and bypasses the Cable Boost Device 118. The shields of the coax pairs 402, 404, 406, 408, and 410 serve as conductors for the HDMI signals CEC, SCL, +5V Power, SDA, and DDC/CEC Ground respectively.

TABLE 3

Preferred Signal Routing in HEAC-capable Coax HDMI Cable 102.3

| HDMI Signal Name | Input Connection 212 | Raw Cable 108.2 | Boost Device Input | Boost Device Output | Output Connection 214 |
|---|---|---|---|---|---|
| TMDS Data2 Shield | txD2s | 410.shield | --> | --> | rxD2s |
| TMDS Data2+ | txD2+ | 402.a | D2+ | C2+ | rxD2+ |
| TMDS Data2− | txD2− | 402.b | D2− | C2− | rxD2− |
| TMDS Data1 Shield | txD1s | 410.shield | --> | --> | rxD1s |
| TMDS Data1+ | txD1+ | 404.a | D1+ | C1+ | rxD1+ |
| TMDS Data1− | txD1− | 404.b | D1− | C1− | rxD1− |
| TMDS Data0 Shield | txD0s | 410.shield | --> | --> | rxD0s |
| TMDS Data0+ | txD0+ | 406.a | D0+ | C0+ | rxD0+ |
| TMDS Data0− | txD0− | 406.b | D0− | C0− | rxD0− |
| TMDS Clock Shield | txCKs | 410.shield | — | — | — |
|  |  |  | Pgm | --> | rxCKs |
| TMDS Clock+ | txCK+ | 408.a | D3+ | C3+ | rxCK+ |
| TMDS Clock− | txCK− | 408.b | D3− | C3− | rxCK− |
| DDC/CEC Ground | txGnd | 410.shield | GND | --> | rxGnd |
| CEC | txCEC | 402.shield | --> | --> | rxCEC |
| SCL | txSCL | 404.shield | --> | --> | rxSCL |
| SDA | txSDA | 408.shield | --> | --> | rxSDA |
| HEAC− | txHEAC+ | 410 | --> | --> | rxHEAC− |
| +5 V Power | txPWR | 406.shield | +5 V | --> | rxPWR |
| HEAC+ | txHEAC+ | 410.b | --> | --> | rxHEAC+ |

The incoming shields of the HDMI high-speed data channels TMDS D2, D1, D0, and the TMDS Clock, are tied to the DDC/CEC Ground connection through the shield of the coax pair 410 of the cable, thus providing a connection to the outgoing shields of the HDMI high-speed data channels TMDS D2, D1, and D0. The outgoing shield of the TMDS Clock (rxCKs) is connected to the programming pin (Pgm) of the Cable Boost Device 118 as described above with reference to the Basic Coax HDMI Cable 102.1.

The preferred HDMI signal routing of the HEAC-Capable Coax HDMI Cable 102.3 is listed in Table 3.

Figure 6:
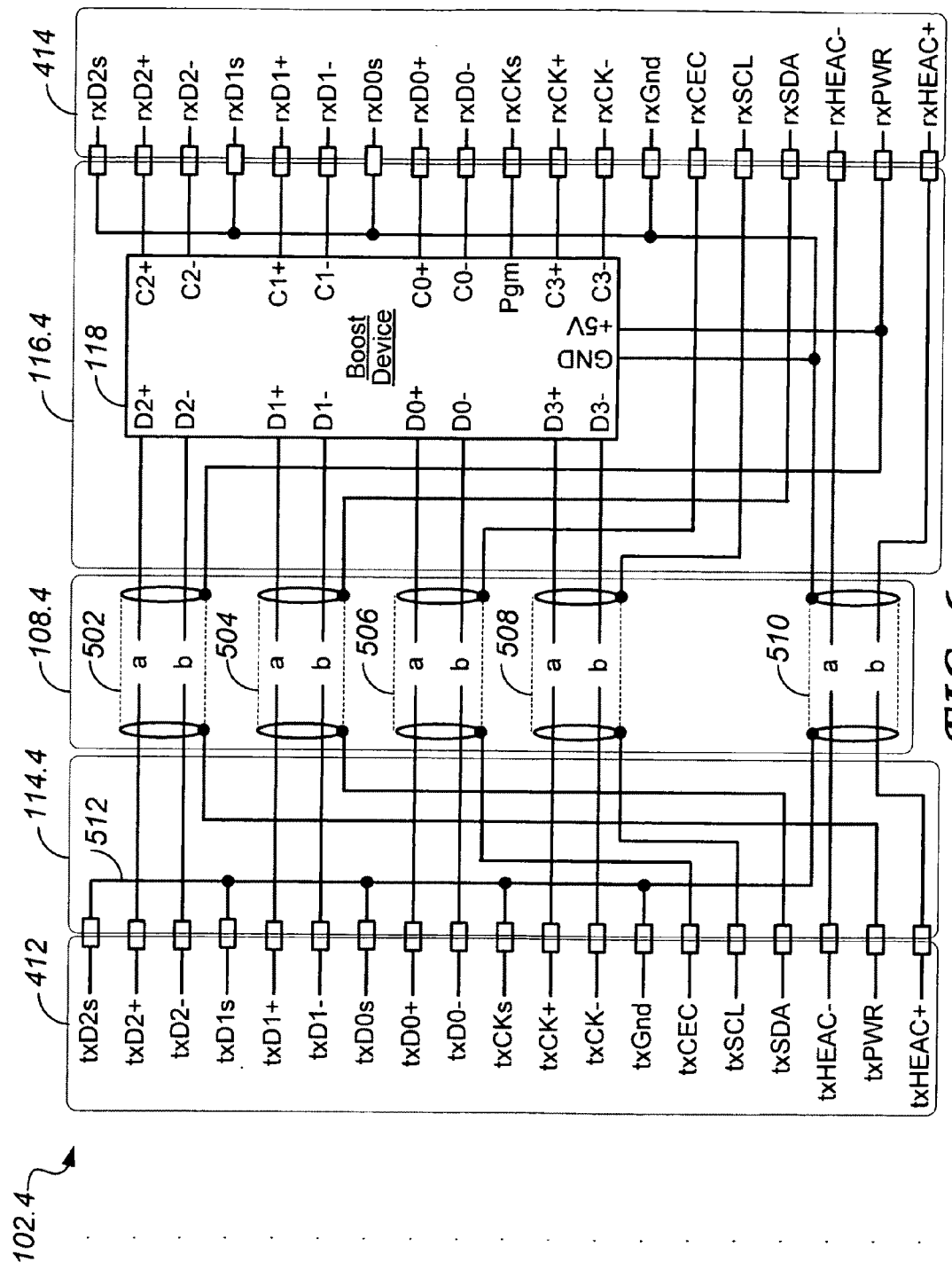
FIG. 6 shows a HEAC-Capable STP HDMI Cable 102.4 based on Shielded Twisted Pair (STP) technology according to a fourth embodiment of the invention.

FIG. 6 shows a HEAC-Capable STP HDMI Cable 102.4, based on Shielded Twisted Pair (STP) technology and capable of carrying an HEAC channel, including a fourth Input Paddle Board 114.4, a fourth Raw Cable 108.4, and a fourth Output Paddle Board 116.4 according to a fourth embodiment of the invention.

The HEAC-capable Input and Output Connection Fields 412 and 414 of the HEAC-Capable STP HDMI Cable 102.4, including the respective terminals remain unchanged from the HEAC-Capable Coax HDMI Cable 102.3. The fourth Raw Cable 108.4 comprises five Shielded Twisted Pairs (STPs) 502, 504, 506, 508, and 510, each comprising a shield and two signal wires "a" and "b" as described in FIG. 1A. The allocation of the HDMI signals to connections through the fourth Raw Cable 108.4 is provided by configurations of the fourth Input and Output Paddle Boards 114.4 and 116.4 respectively.

The STPs 502, 504, 506, 508, and 510 of the fourth Raw Cable 108.4 provide 15 (3×5) distinct conductive paths, the same number as provided in the third Raw Cable 108.3. Accordingly, an analogous allocation of the individual signals to the Shielded Twisted Pairs including their shields, could be made. Similarly, part of the allocation scheme could also be "borrowed" from the other STP based embodiment (the Basic STP HDMI Cable 102.2) and suitably modified to accommodate the HEAC signal.

A different connection allocation scheme is proposed here to illustrate the considerable latitude available in choosing configurations. The preferred assignments for the HEAC-Capable STP HDMI Cable 102.4 are illustrated in FIG. 6 as well as in Table 4.

As indicated earlier, the preferred assignments of signal leads in the cables are shown in the Tables 1, 2, 3, and 4. These are to some extent arbitrary. The "+5V Power" and the "DDC/CEC Ground" connections are preferably carried on a shield; the HDMI high speed data signals (TMDS D0, D1, D2, and Clock) should always be carried on shielded conductors, i.e. the inner conductors of coax lines or the twisted signal wires of STPs, depending on wire type; and the lower speed connections (CEC, SCL, SDA, Utility, and HPD) may be carried on inner/signal wires or shields in an arrangement that may be adapted to best utilize the space on the paddle boards and the configuration of the respective connectors.

The use of the TMDS Clock Shield connection on the receive side (rxCKs) to access the programming pin (Pgm) of the Cable Boost Device 118 is a convenience for programming the device in the fully assembled boosted HDMI cable. If this feature is not required, the TMDS Clock Shield should be grounded along with the other TDMS signal shields at both ends of the cable.

TABLE 4

Preferred Signal Routing in HEAC-capable STP HDMI Cable 102.4

| HDMI Signal Name | Input Connection 212 | Raw Cable 108.2 | Boost Device Input | Boost Device Output | Output Connection 214 |
|---|---|---|---|---|---|
| TMDS Data2 Shield | txD2s | 510.shield | --> | --> | rxD2s |
| TMDS Data2+ | txD2+ | 502.a | D2+ | C2+ | rxD2+ |
| TMDS Data2− | txD2− | 502.b | D2− | C2− | rxD2− |
| TMDS Data1 Shield | txD1s | 510.shield | --> | --> | rxD1s |
| TMDS Data1+ | txD1+ | 504.a | D1+ | C1+ | rxD1+ |
| TMDS Data1− | txD1− | 504.b | D1− | C1− | rxD1− |
| TMDS Data0 Shield | txD0s | 510.shield | --> | --> | rxD0s |
| TMDS Data0+ | txD0+ | 506.a | D0+ | C0+ | rxD0+ |
| TMDS Data0− | txD0− | 506.b | D0− | C0− | rxD0− |
| TMDS Clock Shield | txCKs | 510.shield | — | — | — |
| | | | Pgm | --> | rxCKs |
| TMDS Clock+ | txCK+ | 508.a | D3+ | C3+ | rxCK+ |
| TMDS Clock− | txCK− | 508.b | D3− | C3− | rxCK− |
| DDC/CEC Ground | txGnd | 510.shield | GND | --> | rxGnd |
| CEC | txCEC | 506.shield | --> | --> | rxCEC |
| SCL | txSCL | 508.shield | --> | --> | rxSCL |
| SDA | txSDA | 504.shield | --> | --> | rxSDA |
| HEAC− | txHEAC--> | 510 | --> | --> | rxHEAC− |
| +5 V Power | txPWR | 502.shield | +5 V | --> | rxPWR |
| HEAC+ | txHEAC+ | 510.b | --> | --> | rxHEAC+ |

DisplayPort Cables

Figure 7:
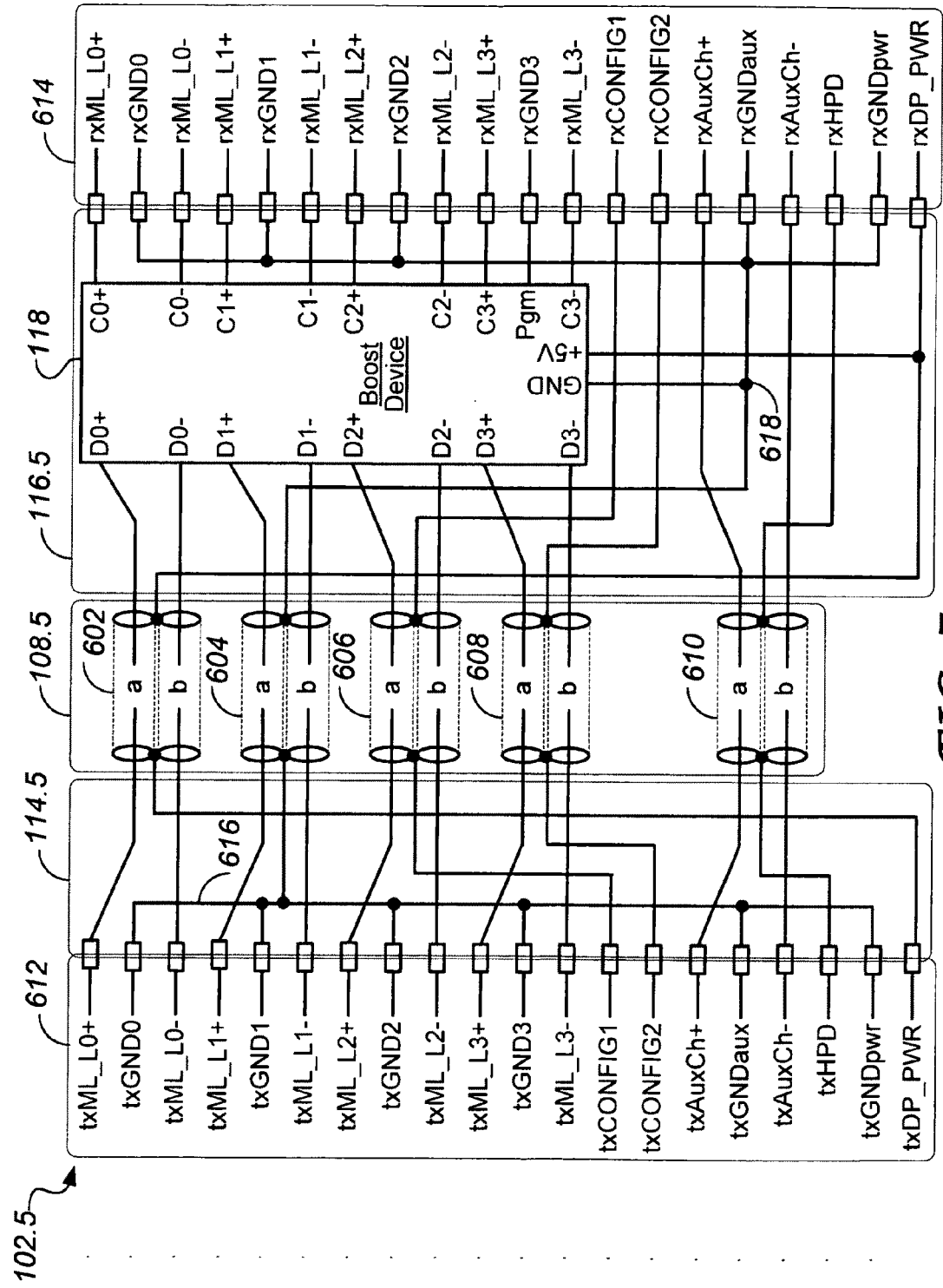
FIG. 7 shows a Coax DisplayPort Cable 102.5 based on coax technology according to a fifth embodiment of the invention.

FIG. 7 shows a Coax DisplayPort Cable 102.5 based on coax technology, including a fifth Input Paddle Board 114.5, a fifth Raw Cable 108.5, and a fifth Output Paddle Board 116.5 according to an embodiment of the invention. The fifth Raw Cable 108.5 includes a total of ten individual coaxial lines arranged in five coax pairs 602, 604, 606, 608, and 610. Each coax pair 602 to 610 comprises two coaxial lines with inner signal wires labeled as "a" and "b", and two shields which are joined together such that the joined shields form a single conductive path. Thus, each of the coax pairs 602 to 608 provides three electrical connections, i.e. one differential connection (wires "a" and "b") and one single-ended connection (the joined shields), as described earlier (see FIG. 1B).

The same Cable Boost Device 118 as in the boosted HDMI cables described above, is comprised within the fifth Output Paddle Board 116.5.

Standard DisplayPort signals from the Video Source Device (Tx) 104, are connected to terminals in a DisplayPort Input Connection Field 612 of the Coax DisplayPort Cable 102.5, and recovered at the opposite end of the cable at terminals of a DisplayPort Output Connection Field 614 for transmission to the Video Sink Device (Rx) 106. The DisplayPort signal names and corresponding terminal labels of the DisplayPort Input and Output Connection Fields 612 and 614 are listed in Table 5, which shows the preferred connection arrangement, or signal allocation scheme, for the Coax DisplayPort Cable 102.5.

Referring to FIG. 7 and Table 5, each of the four DisplayPort high speed differential data lanes ML-L0, ML-L1, ML-L2, and ML-L3, is routed through the Coax DisplayPort Cable 102.5 as described in the following:

The Main Line Lane0 differential signal, comprising positive (p) and negative (n) polarities is:
- connected from the Video Source Device (Tx) 104 to txML_L0+ and txML_L0− terminals in the DisplayPort Input Connection Field 612;
- routed in the fifth Input Paddle Board 114.5 to the inner signal wires "a" and "b" of the coax pair 602;
- routed through the fifth Raw Cable 108.5 on the inner signal wires "a" and "b" of the coax pair 602 of the fifth Raw Cable 108.5;
- coupled from the end of the fifth Raw Cable 108.5 to D0+ and D0− inputs of the Cable Boost Device 118 in the fifth Output Paddle Board 116.5; and coupled from the C0+ and C0− outputs of the Cable Boost Device 118 to rxML_L0+ and rxML_L0− terminals in the DisplayPort Output Connection Field 614.

The other three main-line differential data signals (Main Line Lane1, Lane2, and Lane 3) are similarly connected, see Table 5.

All ground connections of the incoming DisplayPort connector which are labeled txGND0, txGND1, txGND2, txGND3, txGNDaux as well as the "Return" (txGNDpwr), i.e. the power return terminal, are tied together to an input common ground node 616 in the fifth Input Paddle Board 114.5, and connected to the shield of the coax pair 604.

In the fifth Output Paddle Board 116.5, the shield of the coax pair 604 is connected to an output common ground node 618 which is also connected to the ground (GND) input of the Cable Boost Device 118, and to shield and ground connections of the Video Sink Device (Rx) 106, namely terminals rxGND0, rxGND1, rxGND2, rxGNDaux, and txGNDpwr. An exception is the fourth ground pin of the receive side which is connected through a terminal rxGND3 to the programming (Pgm) input of the Cable Boost Device 118, and so is only indirectly grounded. This allows the Cable Boost Device 118 to be programmed from the connector after the boosted cable is assembled without requiring any additional wire to access it. Alternatively, the rxGND3 terminal may also be grounded at the output common ground node 618 along with the other ground connections.

Other DisplayPort signals CONFIG1, CONFIG2, AUX Channel (p) and (n), Hot Plug, and DP_PWR, are respectively connected in the fifth Input Paddle Board 114.5 to terminals txCONFIG1, txCONFIG2, txAuxCh+ and txAuxCh−, txHPD, and txDP_PWR. In the fifth Output Paddle Board 116.5. they are respectively connected to terminals rxCONFIG1, rxCONFIG2, rxAuxCh+ and rxAuxCh−, rxHPD, and rxDP_PWR. Compared to the main line high speed signals which are boosted by the Boost Device 118, these other DisplayPort signals are at a lower speed, bypass the Cable Boost Device 118, and may be carried on the inner wires or over the shields of the coaxial lines as may be convenient. The AUX Channel signal however is of moderately high speed and is required to be carried in a controlled impedance wire, for which the coax pair 610 is chosen in this embodiment of the invention.

In the Coax DisplayPort Cable 102.5, the remaining signals are carried over the cable as follows:

CONFIG1 from the terminal txCONFIG1, over the combined shields of the coax pair 606, to the terminal rxCONFIG1;

CONFIG2 from the terminal txCONFIG2, over the combined shields of the coax pair 608, to the terminal rxCONFIG2;

Hot Plug from the terminal txHPD, over the combined shields of the coax pair 610, to the terminal rxHPD; and DP_PWR from the terminal txDP_PWR, over the combined shields of the coax pair 602, to the terminal rxDP_PWR.

In the fifth Output Paddle Board 116.5 the DP_PWR is also connected to the power input (+5V) of the Cable Boost Device 218. Even though the voltage of DP_PWR will be lower than the HDMI +5V Power, the same Cable Boost Device 218 may be designed or programmed to run at both the HDMI and the DisplayPort voltages. Alternatively, a DisplayPort specific version of the Cable Boost Device 218 may be developed.

TABLE 5

Preferred Signal Routing in Coax DisplayPort Cable 102.5

| DisplayPort Signal Name | Input Connection 212 | Raw Cable 108.1 | Boost Device Input | Boost Device Output | Output Connection 214 |
|---|---|---|---|---|---|
| Main Line Lane0 (p) | txML_L0+ | 602 | D0+ | C0+ | rxML_L0+ |
| Ground (pin 2) | txGND0 | 604.shield | --> | --> | rxGND0 |
| Main Line Lane0 (n) | txML_L0− | 602.b | D0− | C0− | rxML_L0− |
| Main Line Lane1 (p) | txML_L1+ | 604 | D1+ | C1+ | rxML_L1+ |
| Ground (pin 5) | txGND1 | 604.shield | --> | --> | rxGND1 |
| Main Line Lane1 (n) | txML_L1− | 604.b | D1− | C1− | rxML_L1− |
| Main Line Lane2 (p) | txML_L2+ | 606 | D2+ | C2+ | rxML_L2+ |
| Ground (pin 8) | txGND2 | 604.shield | --> | --> | rxGND2 |
| Main Line Lane2 (n) | txML_L2− | 606.b | D2− | C2− | rxML_L2− |
| Main Line Lane3 (p) | txML_L3+ | 608 | D3+ | C3+ | rxML_L3+ |
| Ground (pin 11) | txGND3 | 604.shield | Pgm | --> | rxGND3 |
| Main Line Lane0 (n) | txML_L3− | 608.b | D3− | C3− | rxML_L3− |
| CONFIG1 | txCONFIG1 | 606.shield | --> | --> | rxCONFIG1 |
| CONFIG2 | txCONFIG2 | 608.shield | --> | --> | rxCONFIG2 |
| AUX Channel (p) | txAuxCh+ | 610 | --> | --> | rxAuxCh+ |
| Ground (pin 16) | txGNDaux | 604.shield | --> | --> | rxGNDaux |
| AUX Channel (n) | txAuxCh− | 610.b | --> | --> | rxAuxCh− |
| Hot Plug | txHPD | 610.shield | --> | --> | rxHPD |
| Return | txGNDpwr | 604.shield | GND | --> | rxGNDpwr |
| DP_PWR | txDP_PWR | 602.shield | +5 V | --> | rxDP_PWR |

Figure 8:
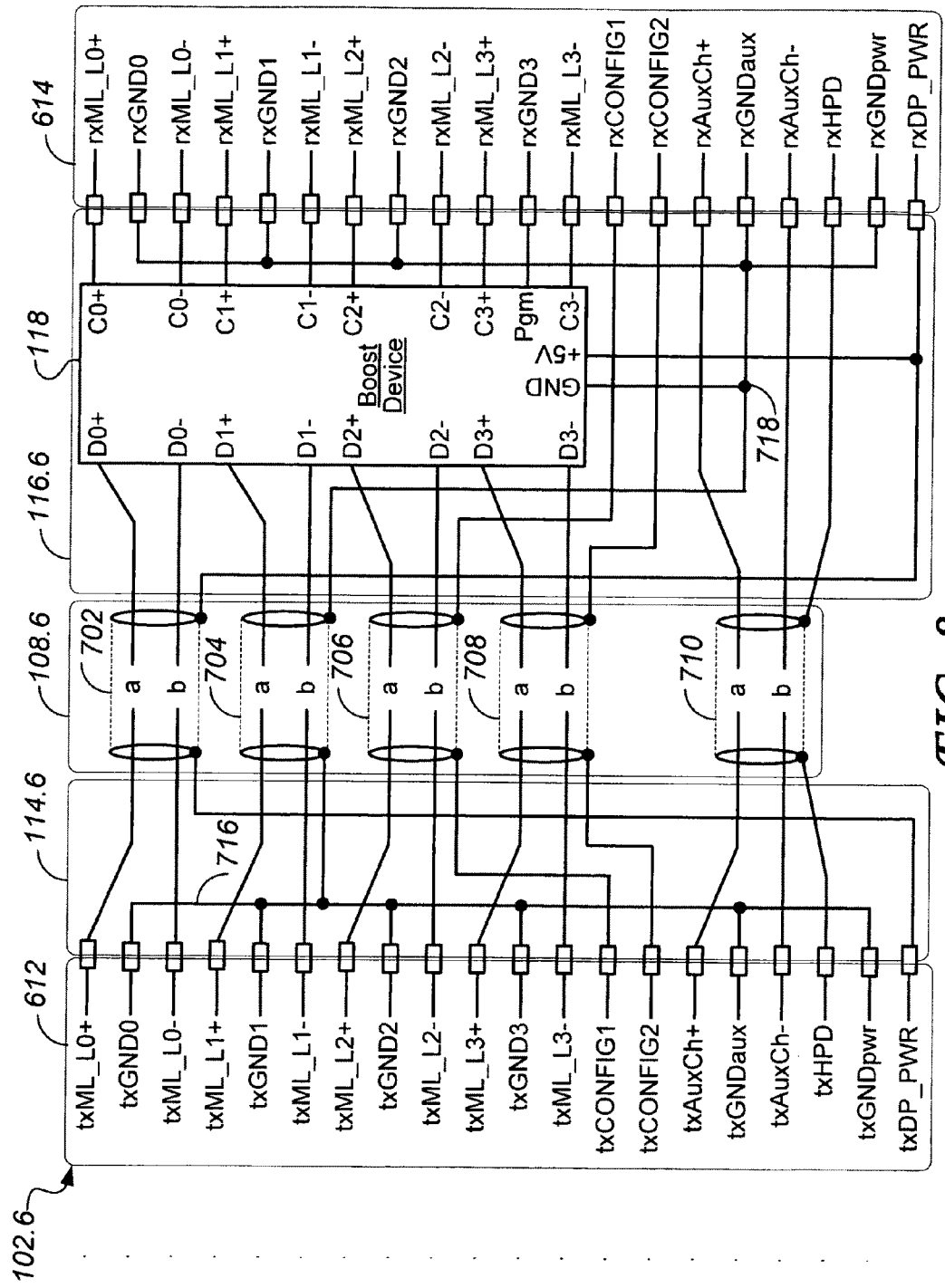
FIG. 8 shows a STP DisplayPort Cable 102.6 based on Shielded Twisted Pair (STP) technology according to a sixth embodiment of the invention.

FIG. 8 shows a STP DisplayPort Cable 102.6 based on Shielded Twisted Pair (STP) technology, including a sixth Input Paddle Board 114.6, a sixth Raw Cable 108.6, and a sixth Output Paddle Board 116.6 according to an embodiment of the invention. The sixth Raw Cable 108.6 includes a total of five STPs 702, 704, 706, 708, and 710, each comprising a shield and two signal wires "a" and "b" as described in FIG. 1A.

The allocation of the DisplayPort signals to connections through the sixth Raw Cable 108.6 is provided by configurations of the sixth Input and Output Paddle Boards 114.6 and 116.6 respectively, and is analogous to the allocation in the Coax DisplayPort Cable 102.5, FIG. 7. The STP signal assignments are illustrated in FIG. 8 which is identical to FIG. 7 except for showing Shielded Twisted Pairs (STPs) 702, 704, 706, 708, and 710 instead of coax pairs 602-610. While the sixth Input and Output Paddle Boards 114.6 and 116.6 have similar connectivity to the corresponding fifth Input and Output Paddle Boards 114.5 and 116.5, their mechanical properties would differ in order to accommodate the different termination geometries of the STPs versus the coax pairs on the paddle boards.

All auxiliary signals, CONFIG1, CONFIG2, Hot Plug, Ground and DP_PWR, may be placed over any shields of coaxial or STP lines as may be convenient or for an arrangement that may be adapted to best utilize the space on the paddle boards and the configuration of the respective connectors.

Low Wire Count Summary

The number of wires in a boosted high speed digital video cable such as an HDMI or DisplayPort cable, has been reduced from fourteen or more in prior art cables to nine or ten by using the shields to individually carry active signals as well as power and ground. This reduction is enabled by the boost device which guarantees the removal of potentially harmful common mode interference on the high speed data lines. The reduction in the number of wires simplifies their alignment for termination in the connectors. The original high speed cables use a mix of coaxial lines or shielded twisted pairs and standard wires. The invention provides a reduction in the construction cost of high speed cables by the use of only a single type of wire, either coaxial or STP, to carry all signals. This significantly simplifies cable assembly and allows a single step termination process, ultimately reducing cost.

Low Impedance Cables

In addition to the advantages obtained through the low wire count technique described above, a further cost advantage may be achieved by using coaxial lines or Shielded Twisted Pairs (STP) of a lower impedance than the nominal line impedance implied in the standards, for carrying the high speed data signals in any of the Boosted Digital Video Cables 102 described here.

Figure 9:
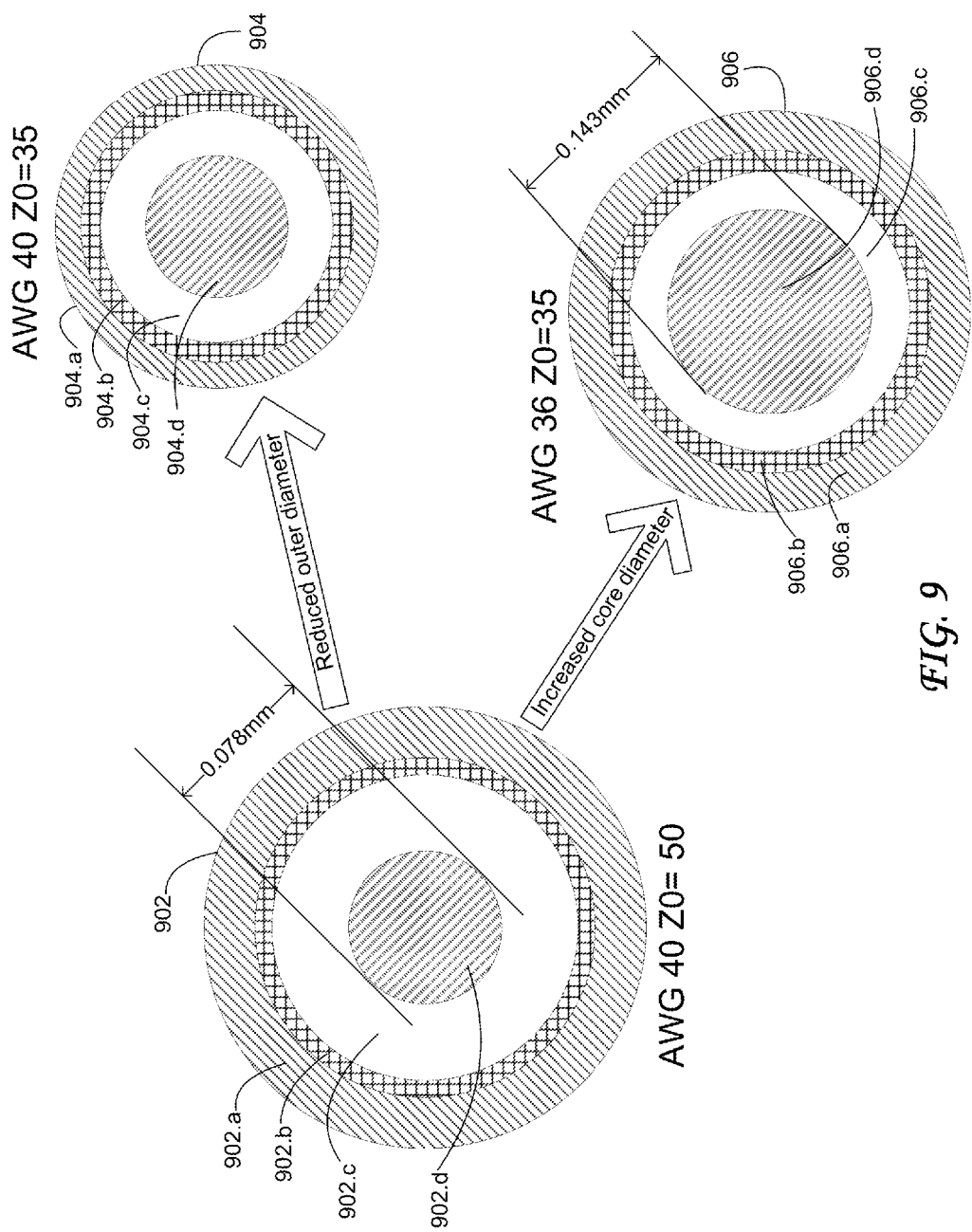
FIG. 9 shows a three coax line cross sections, to illustrate a comparison between exemplary design choices, including a standard coax 902; a reduced-outer-diameter coax 904; and an increased-core-diameter coax 906.

FIG. 9 shows a three coax line cross sections, to illustrate a comparison between exemplary design choices, including a standard coax 902; a reduced-outer-diameter coax 904; and an increased-core-diameter coax 906. The standard coax 902 comprises an outer insulating sheath 902.a, a shield 902.b, an inner insulator 902.c, and a core wire (core) 902.d.

The reduced-outer-diameter coax 904 comprises an outer insulating sheath 904.a, a shield 904.b, an inner insulator 904.c, and a core wire (core) 904.d. The increased-core-diameter coax 906 comprises an outer insulating sheath 906.a, a shield 906.b, an inner insulator 906.c, and a core wire (core) 906.d.

The characteristic impedance Z0 of a coaxial line is determined by dimensions of the cable, more precisely, by the ratio of the diameter of the core wire to the inner diameter of the shield, and by the dielectric constant of the inner isolator material.

The core 902.d of the thin standard coax 902 with a characteristic impedance of 50 ohms is an American Wire Gauge (AWG) wire of about 78 µm diameter, resulting in an overall diameter of the standard coax 902 of about 210 µm.

By allowing the coax to have a lower, "non-standard" characteristic impedance it is possible for example, and without changing the insulator material, to either reduce the outer diameter of the coax without having to use a finer core wire, or to increase the core diameter while keeping the outer diameter constant.

The core 904.d of the reduced-outer-diameter coax 904 is the same wire gauge as the core 902.d of the standard coax 902, but the shield 904.c is shrunk such that a characteristic impedance of 35 ohms is obtained for the reduced-outer-diameter coax 904. This results in an overall diameter of the reduced-outer-diameter coax 902 of about 145 µm, a savings of about 30% compared to the standard coax 902 with 50 ohm characteristic impedance.

If the outer diameter is not changed, a thicker core wire may be used. The shield 906.b, hence the overall diameter of the increased-core-diameter coax 906, corresponds to that of the standard coax 902. However, the thickness of the core 906.d is increased such that a characteristic impedance of 35 ohms is obtained for the increased-core-diameter coax 906, resulting in a wire size of AWG 40 for the core 906.d of the increased-core-diameter coax 906. AWG 35 corresponds to a wire diameter of about 143 µm, an almost 80% increase in thickness.

The inventors have considered the impact of deviating from the standard 50 ohm coax for implementing the HDMI and DisplayPort cables described above, that is the Basic Coax HDMI Cable 102.1, the HEAC-Capable Coax HDMI Cable 102.3, and the Coax DisplayPort Cable 102.5, as well as other boosted digital video cables. To recapitulate, the Video Source Device 104 transmits high speed differential signals through coax pairs to the Cable Boost Device 118 which equalizes and boosts the signals before transmitting them to the Video Sink Device 106.

The Video Source Device 104 is designed to transmit these high speed differential signals over cables presenting a characteristic impedance of 100 ohms differentially, that is 2 times 50 ohms in the case of dual coaxial lines (coax pairs). An input circuit in the Video Sink Device 106 similarly presents matching 100 ohms differential terminations to the cable.

In the case of the boosted cables with a reduced impedance coax, the Cable Boost Device 118 provides a proper output circuit for transmission of the boosted signals to the Video Sink Device 106. An input termination in the Cable Boost Device 118 can be tuned to terminate a reduced impedance cable with the correct impedance, for example 35 ohms, or 70 ohms differentially.

The Video Source Device 104 is designed as a current source and would be able to directly transmit into any cable impedance; no undesired signal reflections would result as long as the cable is correctly terminated at the receiving end, that is at the Cable Boost Device 118. However, compliance testing of HDMI and DisplayPort cables requires the cable to present a nominal 100 ohm differential impedance at source end for a unidirectional active cable and both ends for a passive cable.

Figure 10:
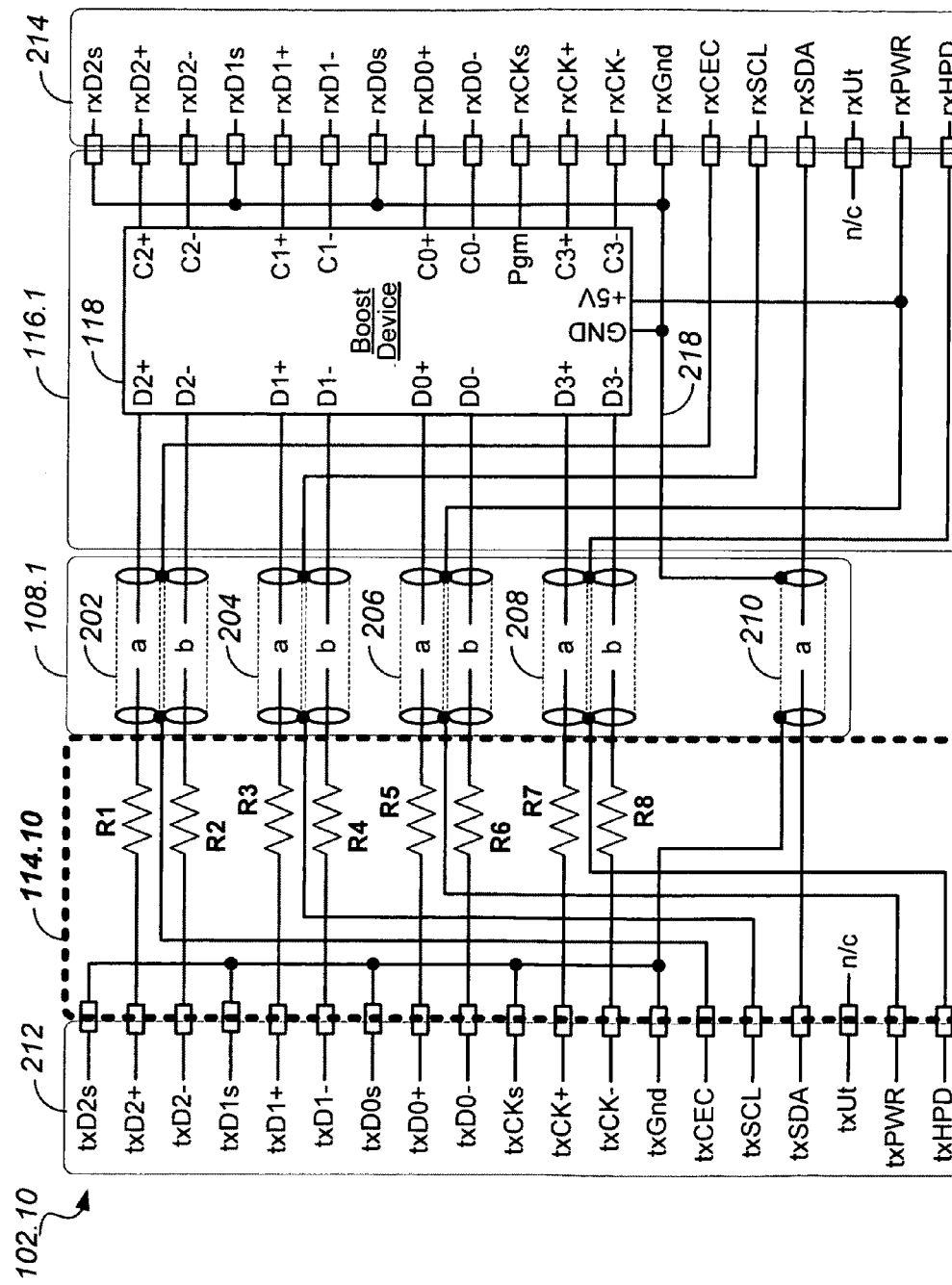
FIG. 10 shows a Low-Impedance (Low Z0) Coax HDMI Cable 102.10 which is identical to the Basic Coax HDMI Cable 102.1 of FIG. 3 except for a Low-Impedance Input Paddle Board 114.10 which replaces the first Input Paddle Board 114.1.

FIG. 10 shows a Low-Impedance (Low Z0) Coax HDMI Cable 102.10 which is identical to the Basic Coax HDMI Cable 102.1 of FIG. 3 except for a Low-Impedance Input Paddle Board 114.10 which replaces the first Input Paddle Board 114.1. The Low-Impedance Input Paddle Board 114.10 has the same connectivity as the first Input Paddle Board 114.1, except for eight padding resistors R1 to R8 which are inserted between the high speed signal terminals txD2+, txD2−, txD1+, txD1−, txD0+, txD02−, txCK+, and txCK− of the Input Connection Field 212, and the inner signal wires "a" and "b" of the corresponding coax pairs 202 to 208 of the first Raw Cable 108.1.

One pair of padding resistors is required to be inserted in series with each of the inner signal wires "a" and "b" of the TMDS signals. The resistance of each padding resistor is derived such that the combined resistance of two padding resistors in series with the inner signal wires (the shielded conductors) of each coax pair (dual shielded cable element) 202 to 208 is equal to the difference between the specified nominal cable impedance and the impedance of the coax pair, for example a 100 ohm nominal impedance is achieved by using two coax lines of 35 ohm impedance, each with 15 ohm padding resistors, as a coax pair.

The padding resistors R1-R8 could be omitted without loss of functionality, but they are provided in order to meet the specified differential input impedance of 100 ohms for the Low-Impedance Coax HDMI Cable 102.10.

If the coax pairs 202 to 208 of the first Raw Cable 108.1 are made of low-impedance coaxial lines, such as the reduced-outer-diameter coax 904 or the increased-core-diameter coax 906 which each have an exemplary characteristic impedance of 35 ohms, the values of each of the padding resistors R1 to R8 should be 50−35=15 ohms, such that each coax pair, combined with the padding resistors, presents a 2×50=100 ohm impedance to the differential terminals of the Input Connection Field 212. In general, the resistance of each padding resistor R1 to R8 should be X ohms, where X is equal to the difference between one half of the specified nominal impedance (e.g. 100 Ohms for HDMI) and the actual characteristic impedance of the coax.

Similarly, other coax based high speed video cables such as the HEAC-Capable Coax HDMI Cable 102.3 (FIG. 5) and the Coax DisplayPort Cable 102.5 (FIG. 7) are easily modified by the addition of the padding resistors R1 to R8 on their respective input paddle boards, to accommodate low-impedance coax cables.

Figure 15:
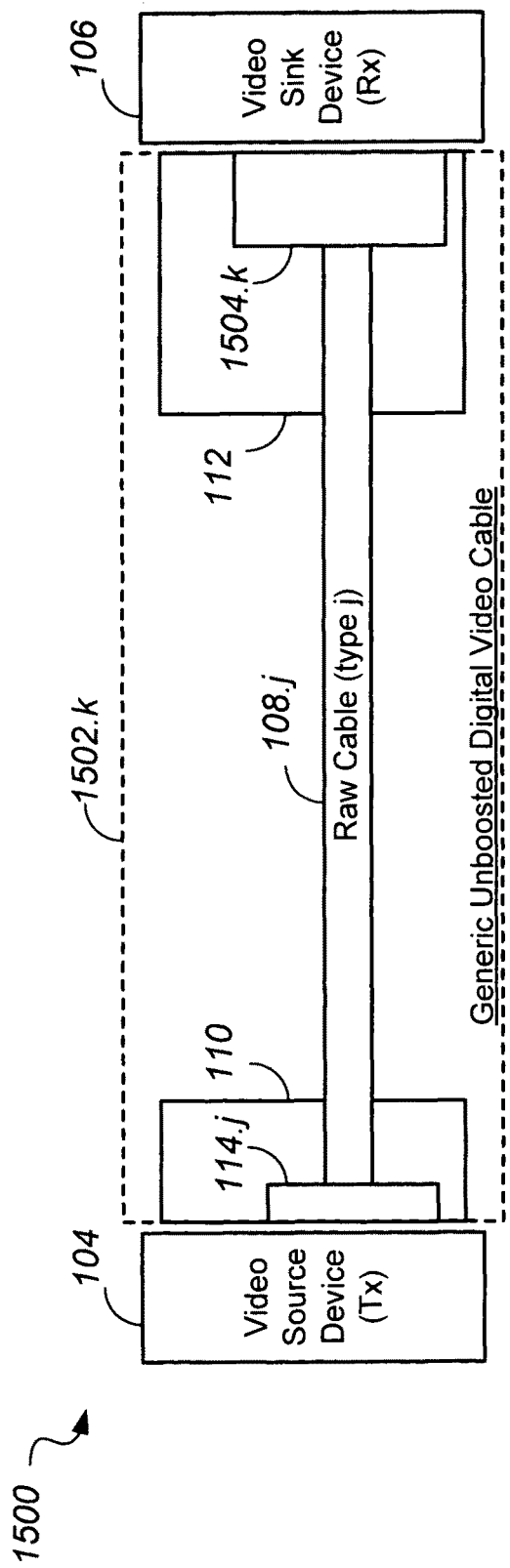
FIG. 15 shows a configuration 1500 of a generic Unboosted Digital Video Cable 1502.k which may be any of a number of types described in the following figures, according to embodiments of the invention, interconnecting the Video Source Device (Tx) 104 and the Video Sink Device (Rx) 106.

It is worth noting that signals other than the high speed differential data signals, for example the HEAC channel of HDMI and the AUX channel of DisplayPort, are not boosted by the Cable Boost Device 118. The coax pairs transporting these signals (coax pair 410 for HEAC, and coax pair 610 for the AUX channel) can not be of the low-impedance type, but must be regular 50 ohm coaxes. Alternatively, these signals may be carried over low-impedance type coax if appropriate padding resistors are provided at both the input and the output Paddle Boards. This concept is not illustrated here, but will be described further below (FIG. 15).

The same techniques for using reduced impedance coax cables also applies for boosted HDMI and DisplayPort cables that use Shielded Twisted Pairs (STP) for transmitting the high speed differential data signals. The characteristic impedance of STPs is determined by the ratio of the insulated wire diameter to the diameter of the bare wire, and the dielectric properties of the insulation material.

Low-impedance STPs are easily made by reducing the thickness of the insulation compared to the diameter of the bare wire. This of course also affects the size of the shield. A reduction in the thickness of STP wire insulation by about 30% without changing the bare wire thickness will reduce the (differential) impedance of the STP from a nominal 100 ohms to 70 ohms. Instead of reducing the size of the STP cable in this way, it is also possible to maintain the original overall size and increase the bare wire thickness.

When a low impedance STP is employed in any of the boosted video cables based on STP technology, such as the Basic STP HDMI Cable 102.2 (FIG. 4), the HEAC-Capable STP HDMI Cable 102.4 (FIG. 6), and the STP DisplayPort Cable 102.6, the same considerations as with the coax based cables apply: the input circuit of the Cable Boost Device 118 should be programmed to match the STP impedance, and the input paddle board should be modified to include padding resistors. Similar to the rule that applies in the coax case, the resistance of each padding resistor R1 to R8 in the STP case should be Y ohms, where Y is equal to one half of the difference between the specified nominal impedance (e.g. 100 Ohms for HDMI) and the actual differential impedance of the STP.

The lowering of the characteristic impedance in coax or STP based cables which include boost devices has a number of advantages which may be exploited, either to reduce the size of the cable for material savings, improved flexibility, etc., or to increase the wire size without reducing the overall size of the cable for improved handling, and lower material cost. Note that thicker wire may actually cost less to produce than very fine wire.

Based on the Basic Coax HDMI Cable 102.1, a further number of inventive concepts are disclosed which may be used separately or in combinations to improve the economic value of high speed data cables, including:
- a boosted video cable, comprising a raw cable with higher impedance (FIG. 11);
- reducing the wire count by splitting coax pairs into individual coax lines (FIG. 12A);
- reducing the wire count by carrying a high speed signal single ended (FIG. 12B);
- reducing the wire count by carrying a signal on the cable's braid (FIG. 13B and FIG. 14);
- providing previously described advantages in a cable without a boost device (FIG. 15 to FIG. 24).

Boosted Video Cable with High Impedance Raw Cable

In some cases, there may be an advantage to manufacture cables with coaxial lines of a higher impedance than the nominal impedance of 50 ohms. Similarly, STPs of a higher differential impedance than the nominal impedance of 100 ohms may be advantageous. These may be valuable, for example to reduce loss in the case of a tinned copper conductor material, by increasing the size of the insulation which increases the impedance of the raw cable.

As mentioned already, the Video Source Device 104 is designed to transmit high speed differential signals over cables presenting a characteristic impedance of 100 ohms differentially, that is 2 times 50 ohms in the case of dual coaxial lines (coax pairs), or over STPs of nominal 100 ohms impedance.

The Cable Boost Device 118 provides a proper impedance output circuit for transmission of the boosted signals to the Video Sink Device 106. An input termination in the Cable Boost Device 118 can be tuned to terminate an increased impedance cable with the correct raw-cable impedance, for example over the range of 60 ohms to 150 ohms differentially.

However, compliance testing of HDMI and DisplayPort cables requires the cable to present a nominal 100 ohm differential impedance at the source end of a unidirectional active cable, such as a boosted cable.

Figure 11:
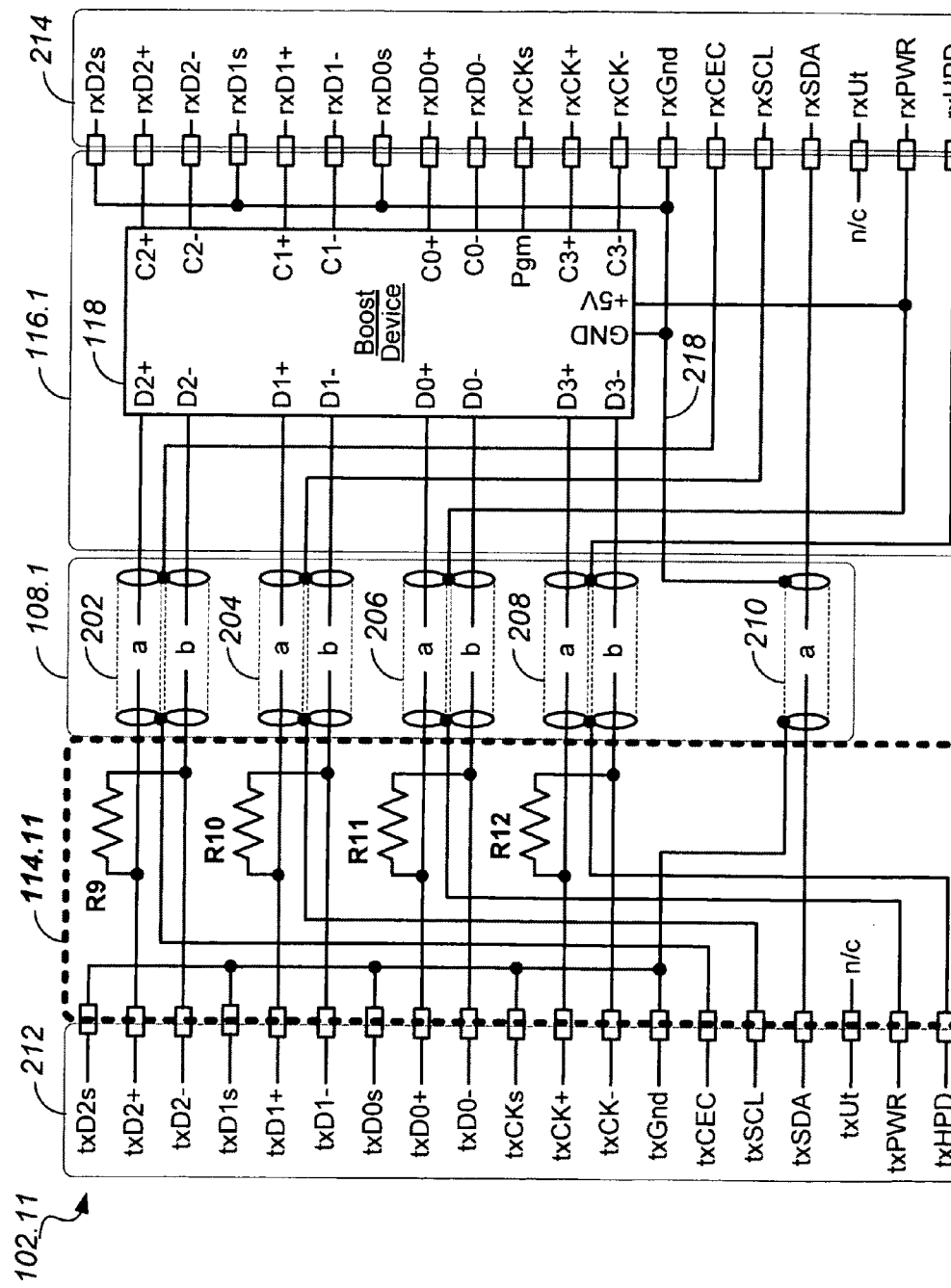
FIG. 11 shows a High-Impedance (High Z0) Coax HDMI Cable 102.11 which is identical to the Basic Coax HDMI Cable 102.1 of FIG. 3 except for a High-Impedance Input Paddle Board 114.11 replacing the first Input Paddle Board 114.1.

FIG. 11 shows a High-Impedance (High Z0) Coax HDMI Cable 102.11 which is identical to the Basic Coax HDMI Cable 102.1 of FIG. 3 except for a High-Impedance Input Paddle Board 114.11 replacing the first Input Paddle Board 114.1. The High-Impedance Input Paddle Board 114.11 has the same connectivity as the first Input Paddle Board 114.1, except for the addition of four shunt resistors R9 to R12 which are connected between the high speed signal terminals of respectively the pairs (txD2+, txD2−), (txD1+, txD1−), (txD0+, txD02−), and (txCK+, and txCK−) of the Input Connection Field 212.

The resistance of each shunt resistor is derived such that the combined resistance of each padding resistor R9 to R12 in parallel with the impedance of the corresponding coax pair (dual shielded cable element) 202 to 208 is equal to the specified nominal cable impedance. For example, where the cable is comprised of coax pairs, each individual coax line having an impedance of Z0=75 ohms, the 100 ohm nominal differential impedance at the cable input may be achieved with 300 ohm shunt resistors as illustrated in FIG. 11. In general, the value of each shunt resistor Rx (R9 to R12) may be calculated as:

$$Rx = 1/((1/Zn) - (1/(2*Z0)))$$, where Z0 is the impedance of the individual coax line, and Zn is the desired differential input impedance of the cable, that is, the inverse of the resistance of the shunt resistor is equal to the difference between the inverse of the nominal impedance Zn and the inverse of the differential impedance of the coax pair which is twice the impedance Z0 of one coaxial line.

The shunt resistors R9 to R12 could be omitted without loss of functionality, but they are provided in order to meet the specified differential input impedance of 100 ohms for the High-Impedance Coax HDMI Cable 102.11.

Similarly, other coax based high speed video cables such as the HEAC-Capable Coax HDMI Cable 102.3 (FIG. 5) and the Coax DisplayPort Cable 102.5 (FIG. 7) are easily modified by the addition of the shunt resistors R9 to R12, placed across respective high speed differential signals on their respective input paddle boards, to accommodate higher impedance coax cables.

It is worth noting that signals other than the high speed differential data signals, for example the HEAC channel of HDMI and the AUX channel of DisplayPort, are not boosted by the Cable Boost Device 118. The coax pairs transporting these signals (the coax pair 410 for HEAC, and the coax pair 610 for the AUX channel) can not be of the high-impedance type, but must be regular 50 ohm coaxes. Alternatively, these signals may be carried over high-impedance type coax if appropriate shunt resistors are provided at both the input and the output Paddle Boards. This concept is not illustrated here.

The same techniques for using increased impedance coax cables may also be applied for boosted HDMI and DisplayPort cables that use Shielded Twisted Pairs (STP) for transmitting the high speed differential data signals. The characteristic impedance of STPs is determined by the ratio of the insulated wire diameter to the diameter of the bare wire, and the dielectric properties of the insulation material.

High-impedance STPs are easily made by increasing the thickness of the insulation compared to the diameter of the bare wire. This of course also affects the size of the shield. An increase in the thickness of STP wire insulation by about 30% without changing the bare wire thickness will increase the differential impedance of the STP from a nominal 100 ohms to 150 ohms. Instead of increasing the size of the STP cable in this way, it is also possible to maintain the original overall size and decrease the bare wire thickness of the twisted wires.

When a high impedance STP is employed in any of the boosted video cables based on STP technology, such as the Basic STP HDMI Cable 102.2 (FIG. 4), the HEAC-Capable STP HDMI Cable 102.4 (FIG. 6), and the STP DisplayPort Cable 102.6, the same considerations as with the coax based cables apply: the input circuit of the Cable Boost Device 118 should be programmed to match the STP impedance, and the respective input paddle boards should be modified to include the shunt resistors R9 to R12.

As illustrated in FIGS. 10 and 11, a corrected effective impedance of the cable, or measured cable input impedance, which is substantially equal to the nominal impedance of the digital video cable specified in the cable specification, is achieved using resistor networks of series or shunt resistors respectively, and thus permits the use of low or high impedance raw cables respectively.

Additional Reduced Wire Count Techniques

For economic reasons, it is desirable to reduce the number of coaxial lines while still carrying all required signals. The technique of carrying a low speed signal in the joined shields of a dual shielded cable element has been described above, for example using the joined shields of the dual shielded cable element 202 (FIG. 3) for carrying the CEC signal. This has resulted in a design in which nine coaxial lines (four dual shielded cable elements and a single coax line) carry fourteen HDMI signals.

In order to further reduce the number of coaxial lines to eight, and still carry fourteen HDMI signals, the inventors propose to split two of the dual shielded cable element into split dual shielded cable elements.

A split dual shielded cable element comprises two coax lines whose shields are not galvanically joined, but only coupled to each other through a capacitor providing AC coupling. At the same time each shield provides an independent capability of carrying a low speed signal.

Figure 12A:
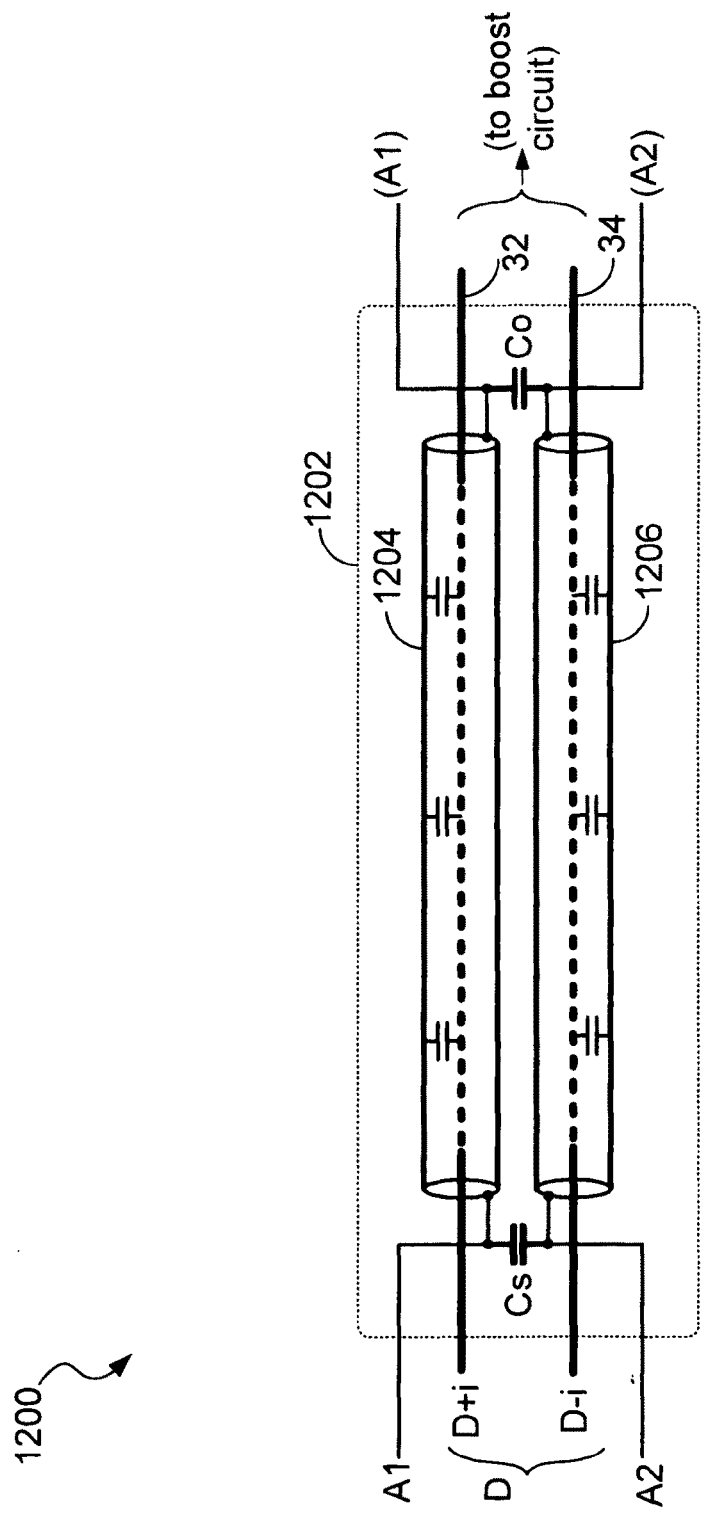
FIG. 12A shows a basic configuration 1200 of a split dual shielded cable element 1202 including two coax lines 1204 and 1206, analogous to the dual coaxial element 12B of FIG. 1b for carrying the differential signal "D"

FIG. 12A shows a basic configuration 1200 of a split dual shielded cable element 1202 including two coax lines 1204 and 1206, analogous to the dual coaxial element 12B of FIG. 1*b* for carrying the differential signal "D" which includes the polarities D+i and D−i. But instead of joining the shields of the two coax lines 1204 and 1206 galvanically, they are only joined in a high-frequency coupling or capacitive coupling through a coupling capacitor Cs, connected to the shields at the inputs of the two coax lines 1204 and 1206. This allows two independent single-ended signals A1 and A2 to be carried on the respective shields while still preserving the transmission characteristics of the dual shielded cable element with respect to the differential data signal "D" which is a high-speed signal.

In the split dual shielded cable element 1202, crosstalk from the shields to the inner conductors carrying the differential signal is no longer automatically cancelled, and it is necessary to carefully select which connections should be carried on the shields. Preferably only static signals such as power and ground should be carried, or the inner conductor(s) may be used to carry the clock signal which is of lower speed than the other high speed signals, and which can be recovered more easily even if it is impacted by some cross talk.

On one hand, the capacitance of the coupling capacitor Cs is chosen to be high enough to preserve transmission characteristics of the dual shielded cable element with respect of the high speed differential signal, including providing A/C coupling between the individual shields to be substantially the same as a galvanic connection between a common shield of a dual shielded element. On the other hand, the capacitance of the coupling capacitor Cs is chosen to be low enough not to cause cross talk between low speed auxiliary signals.

The differential signal from the output of the split dual shielded cable element 1202 is coupled to the boost circuit, while the single-ended signals (A1) and (A2) are simply forwarded. A second (optional) coupling capacitor Co may be used to couple the shields of the coax lines 1204 and 1206 to one another at the cable output. The value of the coupling capacitor Cs (and Co if used) is preferably of the order of 1 nF, to provide an effective AC-short between the shields thus providing substantially the same coupling (with respect to high speed signals) as the galvanic connection of FIG. 1B. This has the effect of adding the (single-ended) impedances of the two coax lines to provide their sum as a differential impedance. At the same time, the coupling capacitor Cs provides negligible coupling between the single-ended signals A1 and A2 which may be DC signals such as power and ground, or low-speed, quasi-static signals such as the HDMI HPD and CEC signals.

Figure 12B:
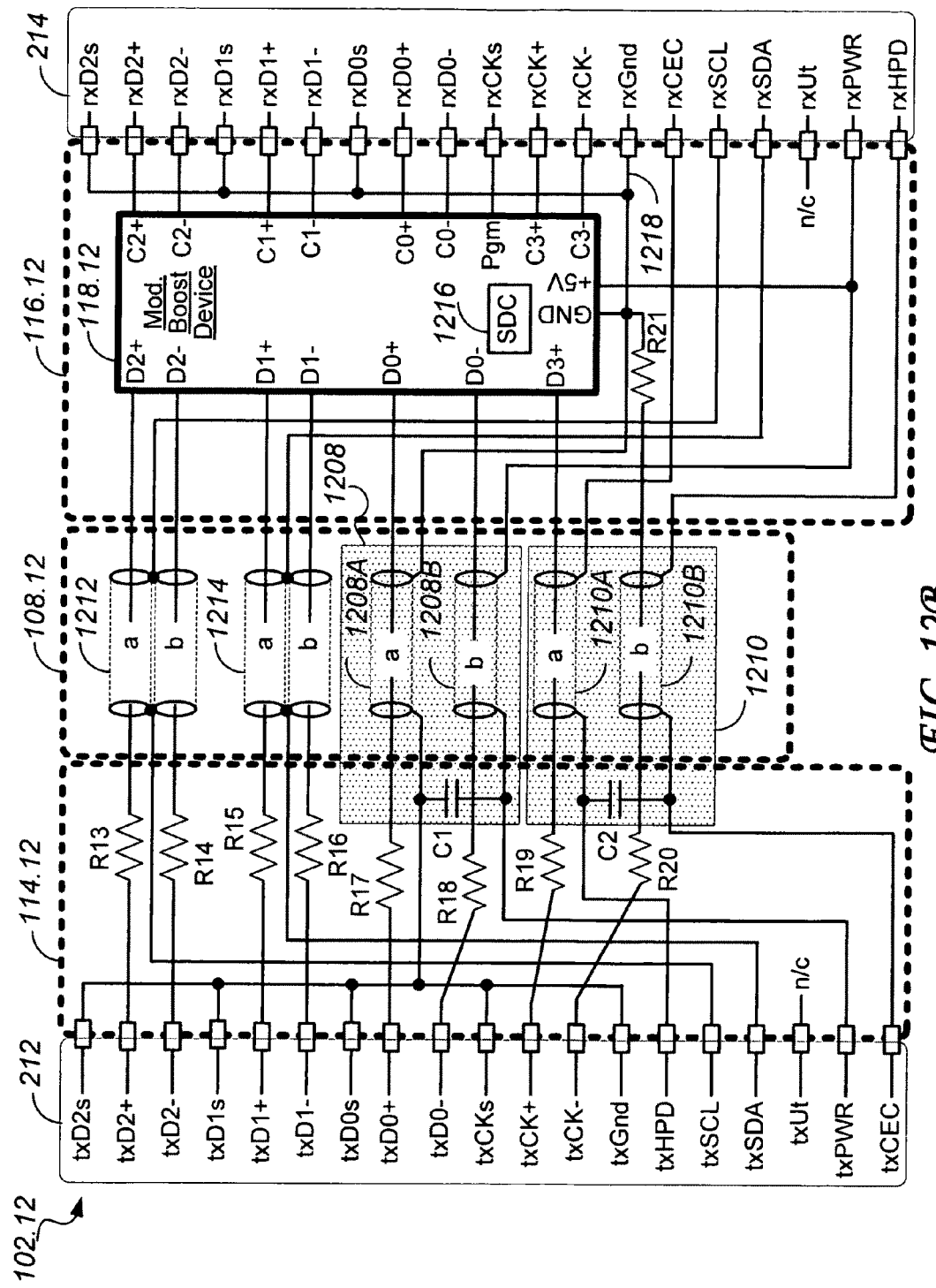
FIG. 12B illustrates a First 8-Coax HDMI Cable 102.12 including a First 8-Coax Input Paddle Board 114.12, a First 8-Coax Raw Cable 108.12, and a First 8-Coax Output Paddle Board 116.12, as well as the Input and Output Connection Fields 212 and 214.

FIG. 12B illustrates a First 8-Coax HDMI Cable 102.12 including a First 8-Coax Input Paddle Board 114.12, a First 8-Coax Raw Cable 108.12, and a First 8-Coax Output Paddle Board 116.12, as well as the Input and Output Connection Fields 212 and 214.

The First 8-Coax HDMI Cable 102.12 incorporates two split dual shielded cable elements 1208 and 1210 each comprising two coax lines (1208A and 1208B, and 1210A and 1210B respectively) in the First 8-Coax Raw Cable 108.12 and corresponding coupling capacitors C1 and C2 mounted on the First 8-Coax Input Paddle Board 114.12.

The First 8-Coax Raw Cable 108.12 further includes two dual shielded cable elements, that is coax pairs 1212 and 1214.

The First 8-Coax Input and Output Paddle Boards 114.12 and 116.12 respectively are arranged to provide connectivity between the Input and Output Connection Fields 212 and the First 8-Coax Raw Cable 108.12. Where the First 8-Coax Raw Cable 108.12 is constructed with low-impedance coax lines, the First 8-Coax Input Paddle Board 114.12 may include padding resistors R13 to R20, analogous to the padding resistors R1 to R8 of FIG. 10, each padding resistor connected in series between a TMDS signal or clock terminal of the Input Connection Field 212 and one of the eight shielded conductors of the dual shielded cable elements or the split dual shielded cable elements.

The resistance value of each of the padding resistors R13 to R20 is determined as the difference between one half of the nominal differential impedance of the First 8-Coax HDMI Cable 102.12, that is 100 ohms for each of the high speed differential data signals, and the impedance of each of the coaxial lines. For example, when 35-ohm coax lines are used in the First 8-Coax Raw Cable 108.12, each padding resistor (R13 to R20) should have a resistance of 15 ohms, so that the nominal differential HDMI impedance of 100 ohms is present at the Input Connection Field 212.

The padding resistors R13 to R20 are omitted when 50-ohm coax lines are used. Alternatively (not shown in FIG. 12B), shunt resistors analogous to the shunt resistors R9 to R12 of FIG. 11 would be used if coax lines of a higher impedance than 50 ohms are used in the First 8-Coax Raw Cable 108.12.

A preferred signal routing in the First 8-Coax HDMI Cable 102.12 is illustrated in FIG. 12B and shown in Table 6 below. The differential TMDS Data signals and the TMDS Clock signal are coupled through the padding resistors R13 to R20 to the inner (shielded) conductors of the eight coax lines.

The galvanically joined shields of the dual shielded cable elements 1212 and 1214 are connected in the paddle boards to carry respectively the low-speed HDMI signals SCL and SDA.

The shields of the four coax lines 1208A, 1208B, 1210A, and 1210B of the two split dual shielded cable elements 1208 and 1210 are connected to carry respectively four static, or predominantly static low speed signals having have substantially static properties, namely: DDC/CEC Ground; +5V Power; CEC; and HPD. The proposed signal assignments of the First 8-Coax HDMI Cable 102.12, shown in FIG. 12B and in Table 6 below are merely examples, and different assignments are equally possible.

TABLE 6

Preferred Signal Routing in First 8-Coax HDMI Cable 102.12

| HDMI Signal Name | Input Connection 212 | Raw Cable 108.12 | Boost Device Input | Boost Device Output | Output Connection 214 |
|---|---|---|---|---|---|
| TMDS Data2 Shield | txD2s | 1208A.shield | --> | --> | rxD2s |
| TMDS Data2+ | txD2+ | 1212.a | D2+ | C2+ | rxD2+ |
| TMDS Data2− | txD2− | 1212.b | D2− | C2− | rxD2− |
| TMDS Data1 Shield | txD1s | 1208A.shield | --> | --> | rxD1s |
| TMDS Data1+ | txD1+ | 1214.a | D1+ | C1+ | rxD1+ |
| TMDS Data1− | txD1− | 1214.b | D1− | C1− | rxD1− |
| TMDS Data0 Shield | txD0s | 1208A.shield | --> | --> | rxD0s |
| TMDS Data0+ | txD0+ | 1208.a | D0+ | C0+ | rxD0+ |
| TMDS Data0− | txD0− | 1208.b | D0− | C0− | rxD0− |
| TMDS Clock Shield | txCKs | 1208A.shield | — | — | — |
| | | | Pgm | --> | rxCKs |
| TMDS Clock+ | txCK+ | 1210.a | D3+ | C3+ | rxCK+ |
| TMDS Clock− | txCK− | 1210.b | — | C3− | rxCK− |
| DDC/CEC Ground | txGnd | 1208A.shield | GND | --> | rxGnd |
| CEC | txCEC | 1210A.shield | --> | --> | rxCEC |
| SCL | txSCL | 1212.shield | --> | --> | rxSCL |
| SDA | txSDA | 1214.shield | --> | --> | rxSDA |
| Utility | txUt | n/c | — | — | rxUt |
| +5 V Power | txPWR | 1208B.shield | +5 V | --> | rxPWR |
| Hot Plug Detect | txHPD | 1210B.shield | --> | --> | rxHPD |

Single Ended Clock Concept

A concept of advantageously carrying an originally differential high speed signal as a single-ended signal is also illustrated in FIG. 12B. The First 8-Coax Output Paddle Board 116.12 includes a Modified Boost Device 118.12, modified from the Boost Device 118 by omitting the negative polarity input D3− of the high speed differential signal input D3. Although only a single ended TMDS clock signal (txCK+->D3+) is thus received by the Modified Boost Device 118.12, the Modified Boost Device 118.12 includes a single-ended to differential converter (SDC) 1216 in which the single ended clock input D3+ is converted to a differential signal, and a differential output is generated at the C3+ and C3− outputs of the Modified Boost Device 118.12. The regenerated differential clock signals (C3+, C3−) are coupled through the Output Connection Field 214 to the output of the First 8-Coax HDMI Cable 102.12 as rxCK+ and rxCK−, and thus the Video Sink Device 106 receives a standard differential clock.

The high speed TMDS Clock signal is received from the Video Source Device at the terminals txCK+ and txCK−, and transmitted through the padding resistors R19 and R20, to the inner conductors of the coax lines 1210A and 1210B respectively of the split dual shielded cable element 1210. Only the positive polarity of the clock signal corresponding to txCK+ is coupled from the output of the inner conductor of the coax line 1210A to the D3+ input of the Modified Boost Device 118.12. The negative polarity of the signal is terminated at the output from the inner conductor of the coax line 1210B on a terminating resistor R21, the terminating resistor R21 being connected to a common output ground node 1218 of the First 8-Coax Output Paddle Board 116.12. The resistance value of the terminating resistor R21 should match the impedance of the coax line 1210B, which may be for example 35 ohms.

The single ended clock concept advantageously exploits the fact that the Video Source Device 104 drives a differential current mode signal which is designed to be terminated in an input circuit of the Video Sink Device 106 (or a boost device) to provide terminating pull-up resistors connected to a bias voltage to each of the two lines of the differential signal path. However in the proposed single ended clock concept, only one of the two lines of the differential signal path is biased by a terminating pull-up resistor in the boost device, the other line being grounded through an external resistor and thus becoming inactive. As a result, the clock signal, although nominally generated as a differential signal, travels as a single ended signal. Several advantages may be obtained from this embodiment: the shield of the single ended clock line txCK+ is used to carry the HPD signal which is normally completely static, and thus no interference is coupled from this shield to txCK+; one external signal pin is saved in the boost device; and less current needs to be supplied by the boost device for receiving the single ended signal compared to a differential signal, thus leaving more power available for other functions of the boost device.

While the termination resistor R21 is preferably realized as a component on the First 8-Coax Output Paddle Board 116.12, it may also be contained in the boost device instead. The termination resistor R21 may be an actual resistor or a resistance element otherwise realized, and may also be referred to as a termination element.

In some applications the SDC 1216 may also be realized independently of the boost device and can so also be used without the boost device in a cable where boosting of other high speed signals is not required.

Carrying a Signal on the Cable Braid

Figure 13A:
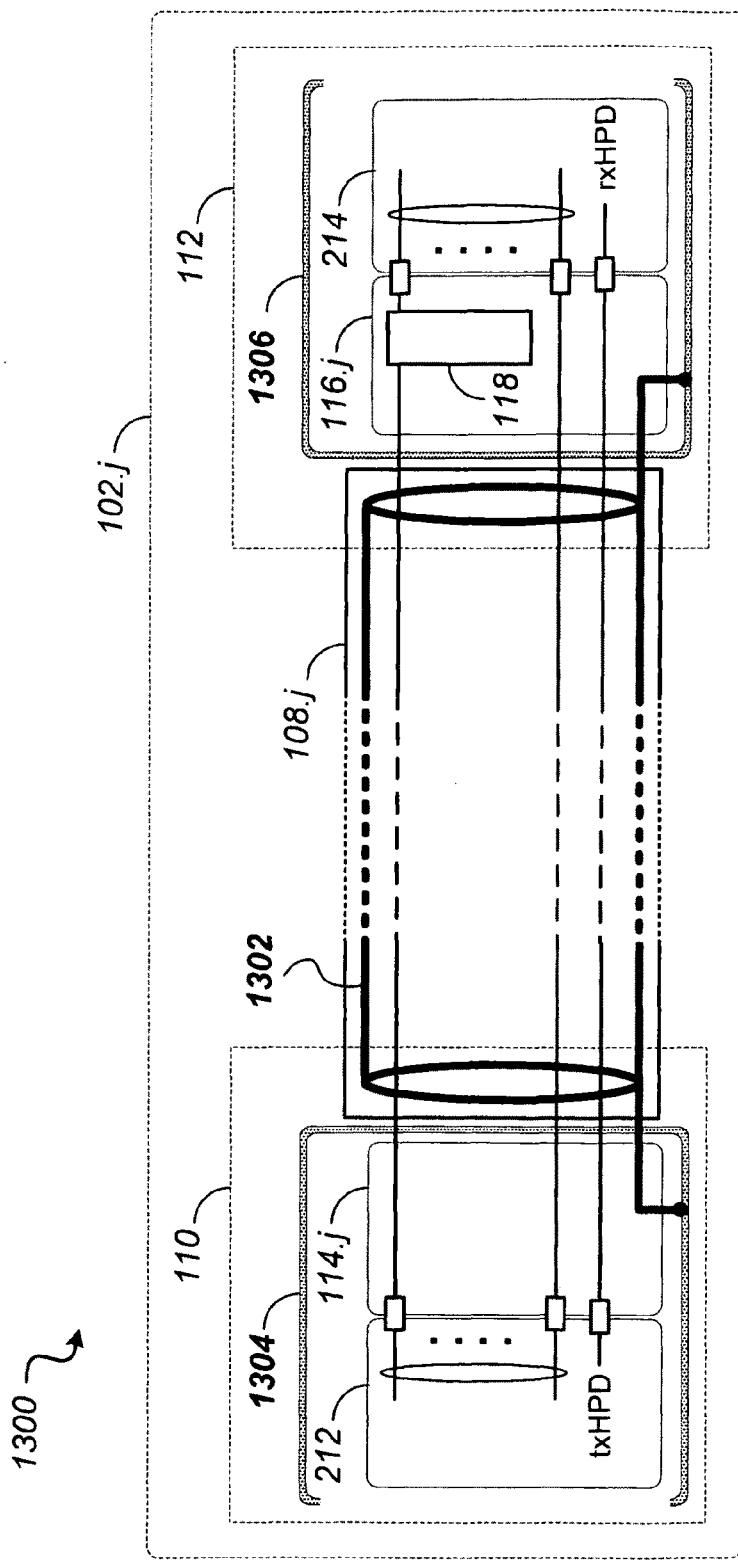
FIG. 13A illustrates an expanded generic diagram 1300 of the generic Boosted Digital Video Cable 102.j of FIG. 2.

FIG. 13A illustrates an expanded generic diagram 1300 of the generic Boosted Digital Video Cable 102.j of FIG. 2, including: the Raw Cable 108.j comprising a Metallic Outer Cable Braid also referred to simply as "Outer Braid", or "Braid" 1302 which encloses signal lines of various types; the Input Connector 110 comprising a metallic Input Connector Shell 1304 which partially encloses the Input Connection Field 212 and the Input Paddle Board 114.j; and the Output Connector 112 comprising a metallic Output Connector Shell 1306 which partially encloses the Output Connection Field 214 and the Output Paddle Board 116.j. The Metallic Outer Cable Braid 1302 provides a galvanic connection between the Input Connector Shell 1304 and the Output Connector Shell 1306, and provides Electromagnetic Interference (EMI) shielding to the entire cable assembly. Normally, the Connector Shells 1304 and 1306 are grounded, and connected with each other through the braid.

The cable braid also provides an electrical path from the input connector to the output connector. In a "Signal on the Braid" concept described below, the cable braid is used in an alternative cable configuration to carry one of the HDMI signals, allowing fourteen HDMI signals to be carried in a cable comprising only eight coax lines.

Figure 13B:
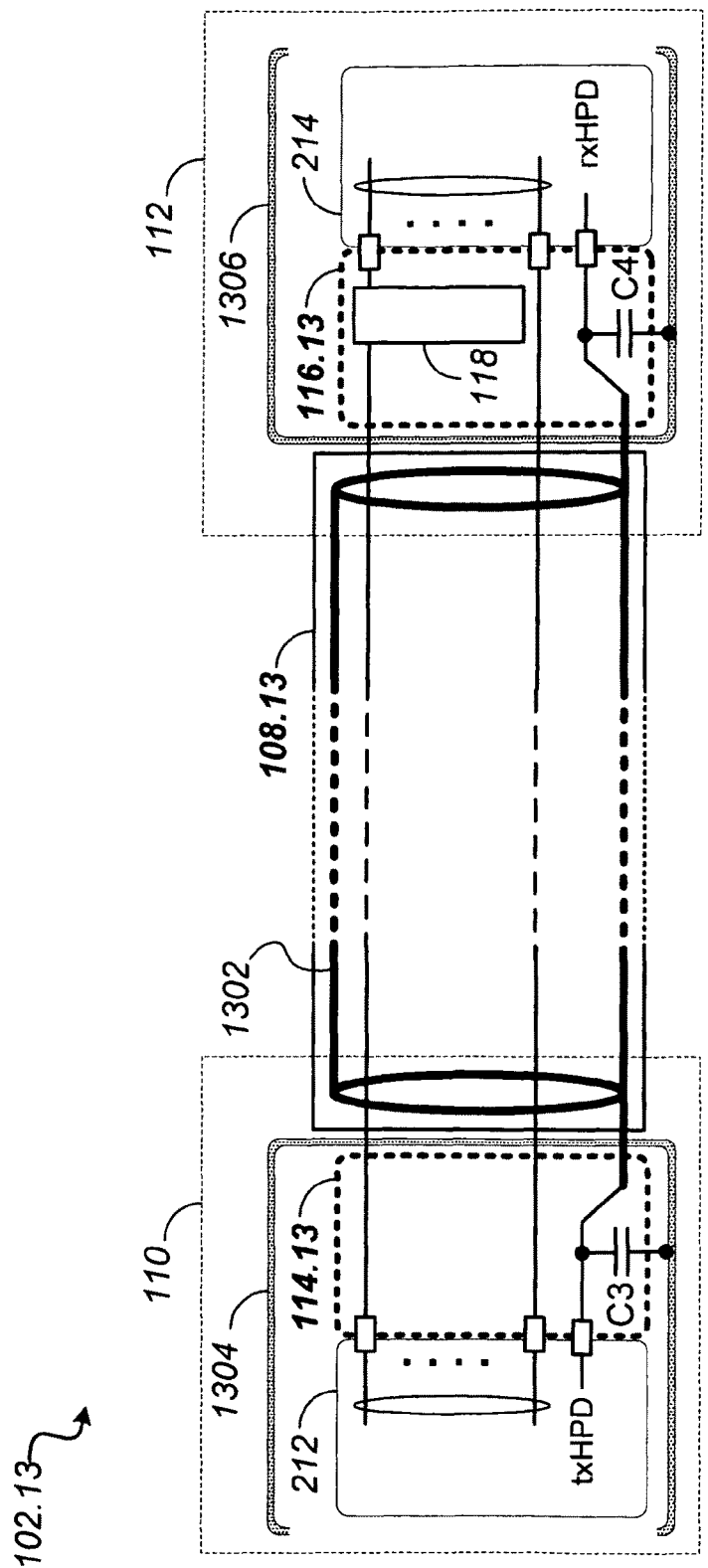
FIG. 13B illustrates a general diagram of a Second 8-Coax HDMI Cable 102.13, which includes a Second 8-Coax Input Paddle Board 114.13, a Second 8-Coax Raw Cable 108.13, and a Second 8-Coax Output Paddle Board 116.13.

FIG. 13B illustrates a general diagram of a Second 8-Coax HDMI Cable 102.13, which includes a Second 8-Coax Input Paddle Board 114.13, a Second 8-Coax Raw Cable 108.13, and a Second 8-Coax Output Paddle Board 116.13. The Second 8-Coax Raw Cable 108.13 includes the Metallic Outer Cable Braid 1302, and the Second 8-Coax Input Paddle Board 114.13 and the Second 8-Coax Output Paddle Board 116.13 are partially enclosed in the Input and Output Connector Shells 1304 and 1306 of the Input and Output Connectors 110 and 112 respectively.

Instead of being directly joined to the metallic shells, as shown in FIG. 13A, the Metallic Outer Cable Braid 1302 is connected to the Input and Output Connector Shells 1304 and 1306 through isolating capacitors C3 and C4 of 0.1 to 1.0 µF, mounted on the Second 8-Coax Input and Output Paddle Boards 114.13 and 116.13 respectively, to provide required EMI shielding. At the same time, the Metallic Outer Cable Braid 1302 is connected to the txHPD and rxHPD signal terminals, to provide a conductive path for the HPD signal. As is well known, the HPD signal is a quasi-static signal whose purpose is to inform the sink and source devices of their mutual connectedness through the cable. By connecting the HPD signal through the cable braid, this purpose is fulfilled without the need for a separate signal wire in the cable. It should be noted that the technique of carrying an auxiliary signal on the cable braid is not limited to just the HPD auxiliary signal. It is potentially valid for any auxiliary signal.

Figure 14:
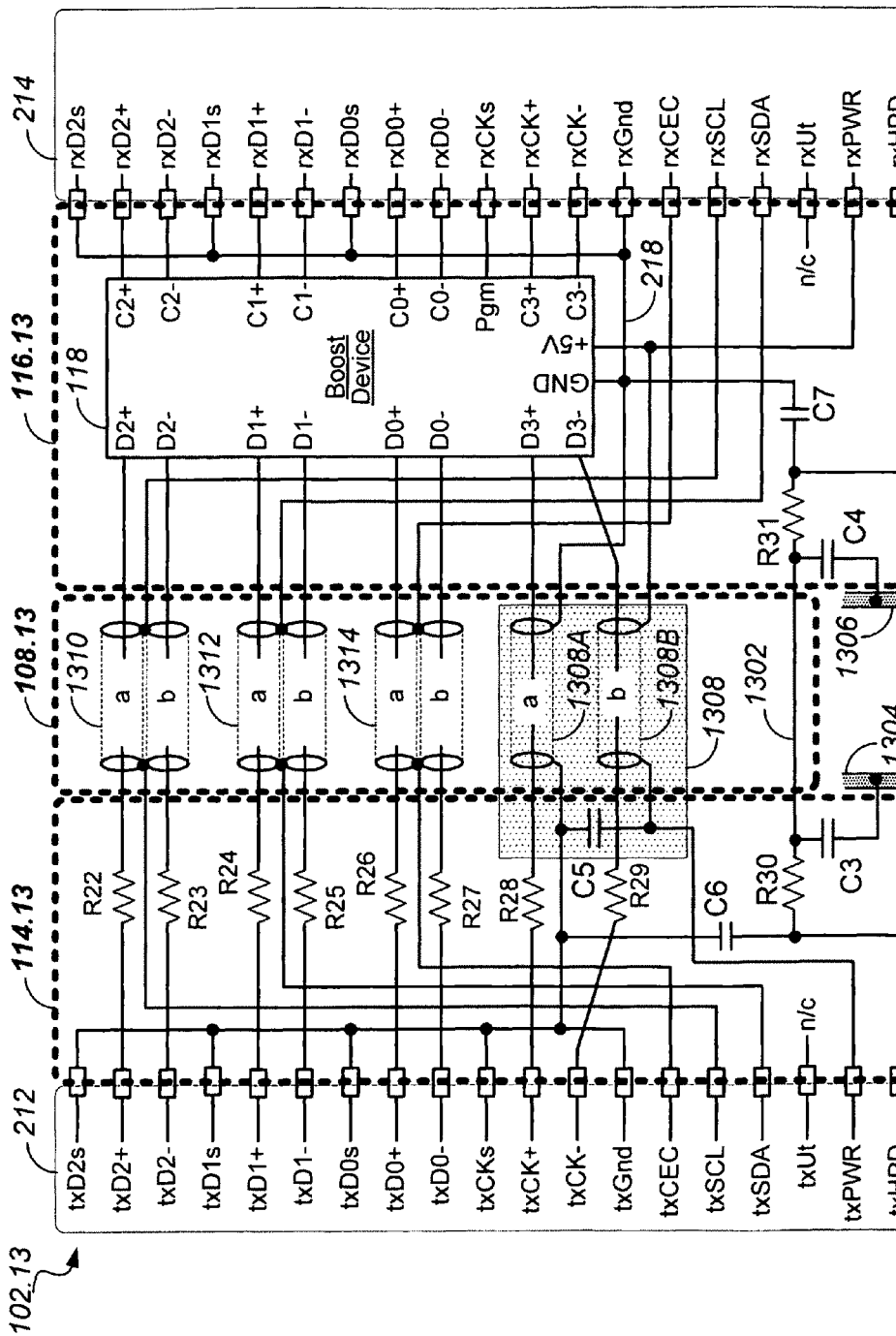
FIG. 14 shows a detailed diagram of the Second 8-Coax HDMI Cable 102.13 of FIG. 13B, including detailed diagrams of the Second 8-Coax Input Paddle Board 114.13, the Second 8-Coax Raw Cable 108.13, and the Second 8-Coax Output Paddle Board 116.13.

FIG. 14 shows a detailed diagram of the Second 8-Coax HDMI Cable 102.13 of FIG. 13B, including detailed diagrams of the Second 8-Coax Input Paddle Board 114.13, the Second 8-Coax Raw Cable 108.13, and the Second 8-Coax Output Paddle Board 116.13.

The Second 8-Coax HDMI Cable 102.13 incorporates one split dual shielded cable element 1308 comprising two coax lines (1308A and 1308B) and a coupling capacitor C5.

The Second 8-Coax HDMI Cable 102.13 incorporates in the Second 8-Coax Raw Cable 108.13 and a corresponding coupling capacitor C5 mounted on the Second 8-Coax Input Paddle Board 114.13.

The Second 8-Coax Raw Cable 108.13 further includes three dual shielded cable elements, that is coax pairs 1310, 1312, and 1314, The Second 8-Coax Input and Output Paddle Boards 114.13 and 116.13 respectively are arranged to provide connectivity between the Input and Output Connection Fields 212 and the Second 8-Coax Raw Cable 108.13. The Second 8-Coax Input Paddle Board 114.13 further includes padding resistors R22 to R29, analogous to the padding resistors R1 to R8 of FIG. 10, each padding resistor connected in series between a TMDS signal or clock terminal of the Input Connection Field 212 and one of the eight shielded conductors of the dual or split dual shielded cable elements.

The resistance value of each of the padding resistors R22 to R29 is determined as the difference between one half of the nominal differential impedance of the Second 8-Coax HDMI Cable 102.13, that is 100 ohms for each of the high speed differential data signals, and the impedance of each of the coaxial lines. For example, when 35-ohm coax lines are used in the Second 8-Coax Raw Cable 108.13, each padding resistor (R22 to R29) should have a resistance of 15 ohms, so that the nominal differential HDMI impedance of 100 ohms is present at the Input Connection Field 212.

The padding resistors R22 to R29 are omitted when 50-ohm coax lines are used. Alternatively (not shown in FIG. 14), shunt resistors analogous to the shunt resistors R9 to R12 of FIG. 11 would be used where coax lines of a higher impedance than 50 ohms are used in the raw cable.

As shown in FIG. 13B, the TMDS HPD signal is carried over the Metallic Outer Cable Braid 1302. The Second 8-Coax Input Paddle Board 114.13 includes an Electrostatic Discharge (ESD) resistor R30 of about 30 ohms in series between the txHPD signal of the Input Connection Field 212 and the Metallic Outer Cable Braid 1302. Similarly, the Second 8-Coax Output Paddle Board 116.13 includes an ESD resistor R31 of about 30 ohms in series between the Metallic Outer Cable Braid 1302 and the rxHPD signal of the Output Connection Field 214. The Second 8-Coax Input and Output Paddle Boards 114.13 and 116.13 further comprise bypass capacitors C6 and C7 respectively, each having a capacitance of about 1 nF, connected between ground (txGnd and rxGnd respectively) and the HPD terminal (txHPD and rxHPD respectively). The purpose of the bypass capacitors C6 and C7 is to dampen any ESD spikes that may occur when the Second 8-Coax HDMI Cable 102.13 is plugged into the video equipment, in order to protect its circuitry.

A preferred signal routing in the Second 8-Coax HDMI Cable 102.13 is illustrated in FIG. 14 and shown in Table 7 below. The differential TMDS Data signals and the TMDS Clock signal are coupled through the padding resistors R22 to R29 to the inner (shielded) conductors of the eight coax lines.

The joined shields of the dual shielded cable elements 1310, 1312, and 1314 are connected to carry respectively the HDMI signals SCL, SDA, and CEC.

The shields of the two coax lines 1308B and 1308A of the split dual shielded cable element 1308 are connected to carry respective two static signals namely: DDC/CEC Ground and +5V Power. Preferred signal assignments of the Second 8-Coax HDMI Cable 102.13 are shown FIG. 14 and in Table 7 below as examples, and different assignments may be equally valid.

TABLE 7

Preferred Signal Routing in Second 8-Coax HDMI Cable 102.13

| HDMI Signal Name | Input Connection 212 | Raw Cable 108.13 | Boost Device Input | Boost Device Output | Output Connection 214 |
|---|---|---|---|---|---|
| TMDS Data2 Shield | txD2s | 1308A.shield | --> | --> | rxD2s |
| TMDS Data2+ | txD2+ | 1310.a | D2+ | C2+ | rxD2+ |
| TMDS Data2− | txD2− | 1310.b | D2− | C2− | rxD2− |

TABLE 7-continued

Preferred Signal Routing in Second 8-Coax HDMI Cable 102.13

| HDMI Signal Name | Input Connection 212 | Raw Cable 108.13 | Boost Device Input | Boost Device Output | Output Connection 214 |
|---|---|---|---|---|---|
| IMDS Data1 Shield | txD1s | 1308A.shield | --> | --> | rxD1s |
| TMDS Data1+ | txD1+ | 1312.a | D1+ | C1+ | rxD1+ |
| TMDS Data1− | txD1− | 1312.b | D1− | C1− | rxD1− |
| IMDS Data0 Shield | txD0s | 1308A.shield | --> | --> | rxD0s |
| TMDS Data0+ | txD0+ | 1314.a | D0+ | C0+ | rxD0+ |
| TMDS Data0− | txD0− | 1314.b | D0− | C0− | rxD0− |
| TMDS Clock Shield | txCKs | 1308A.shield | — | — | — |
|  |  |  | Pgm | --> | rxCKs |
| TMDS Clock+ | txCK+ | 1308.a | D3+ | C3+ | rxCK+ |
| TMDS Clock− | txCK− | 1308.b | D3− | C3− | rxCK− |
| DDC/CEC Ground | txGnd | 1308A.shield | GND | --> | rxGnd |
| CEC | txCEC | 1314.shield | --> | --> | rxCEC |
| SCL | txSCL | 1310.shield | --> | --> | rxSCL |
| SDA | txSDA | 1312.shield | --> | --> | rxSDA |
| Utility | txUt | n/c | — | — | rxUt |
| +5 V Power | txPWR | 1308B.shield | +5 V | --> | rxPWR |
| Hot Plug Detect | txHPD | 1302(braid) | --> | --> | rxHPD |

Unboosted Cables

The techniques described above for carrying signals on the shields of coax lines or STP lines are also valuable when no boost device is integrated in the cable.

While the Boosted Digital Video Cables 102.j include the Boost Device 118 or the Modified Boost Device 118.12, which facilitate use of these cables over greater distances, equivalent unboosted cables can provide the same facilities as the boosted cables but for use over shorter distances, typically not exceeding 2.0 meters for AWG34 wire gauge, 2.5 meters for AWG30 or 5 meters for AWG28 wire gauge depending on physical properties such as intrinsic impedance, capacitance etc.

FIG. 15 shows a configuration 1500 of a generic Unboosted Digital Video Cable 1502.k which may be any of a number of types described in the following figures, according to embodiments of the invention, interconnecting the Video Source Device (Tx) 104 and the Video Sink Device (Rx) 106. The generic Unboosted Digital Video Cable 1502.k is similar in all respects to the generic Boosted Digital Video Cable 102.j, j=k, with the difference being an Unboosted Output Paddle Board 1504.k which replaces the Output Paddle Board 116.j of the generic Boosted Digital Video Cable 102.j.

Various embodiments of the Unboosted Digital Video Cables 1502.k of the invention, described in more detail below, make use of the same Input Paddle Boards 114.j and the same Raw Cables 108.j, as corresponding boosted cables, including the inventive techniques described earlier, of carrying signals on the shields of dual shielded cable elements, i.e. coax pairs (FIG. 3, 5, 7, 10, 11) or Shielded Twisted Pairs 302 to 310 (FIGS. 4, 6, 8), or of split dual shielded cable elements as shown in FIG. 14 which also includes the concept of carrying a signal on the Metallic Outer Cable Braid 1302.

With the exception of the First 8-Coax HDMI Cable 102.12 which relies on the single-ended to differential converter (SDC) 1216 in the Modified Boost Device 118.12, all previously described boosted digital video cables have an unboosted cable equivalent, as shown in Table 8 below which lists for all described cable types reference numbers showing corresponding boosted and unboosted cable versions. 102.10

TABLE 8

Boosted and Unboosted Digital Video Cable equivalents

| Cable Type | Boosted Cable | Raw Cable | Unboosted Cable | Unboosted Output Paddle Board |
|---|---|---|---|---|
| HDMI, coax | 102.1 | 108.1 | 1502.1 | 1504.1 |
| HDMI, STP | 102.2 | 108.2 | 1502.2 | 1504.2 |
| HDMI + HEAC, coax | 102.3 | 108.3 | 1502.3 | 1504.3 |
| HDMI + HEAC, STP | 102.4 | 108.4 | 1502.4 | 1504.4 |
| DisplayPort, coax | 102.5 | 108.5 | 1502.5 | 1504.5 |
| DisplayPort, STP | 102.6 | 108.6 | 1502.6 | 1504.6 |
| Low-Z0 coax HDMI | 102.10 | 108.1 | 1502.10 | 1504.10 |
| High-Z0 coax HDMI | 102.11 | 108.1 | 1502.11 | 1504.11 |
| First 8-coax HDMI | 102.12 | 108.12 | N/A | N/A |
| Second 8-coax HDMI | 102.13 | 108.13 | 1502.13 | 1504.13 |

FIGS. 16 to 24 showing unboosted cable types are distinguished from the otherwise identical corresponding figures of boosted cable types, by new Unboosted Output Paddle Boards 1504.k, shown in bold outline in the drawings. These Unboosted Output Paddle Boards 1504.k may be realized as identical mirror images of the corresponding Input Paddle Boards 114.j, k=j.

Figure 16:
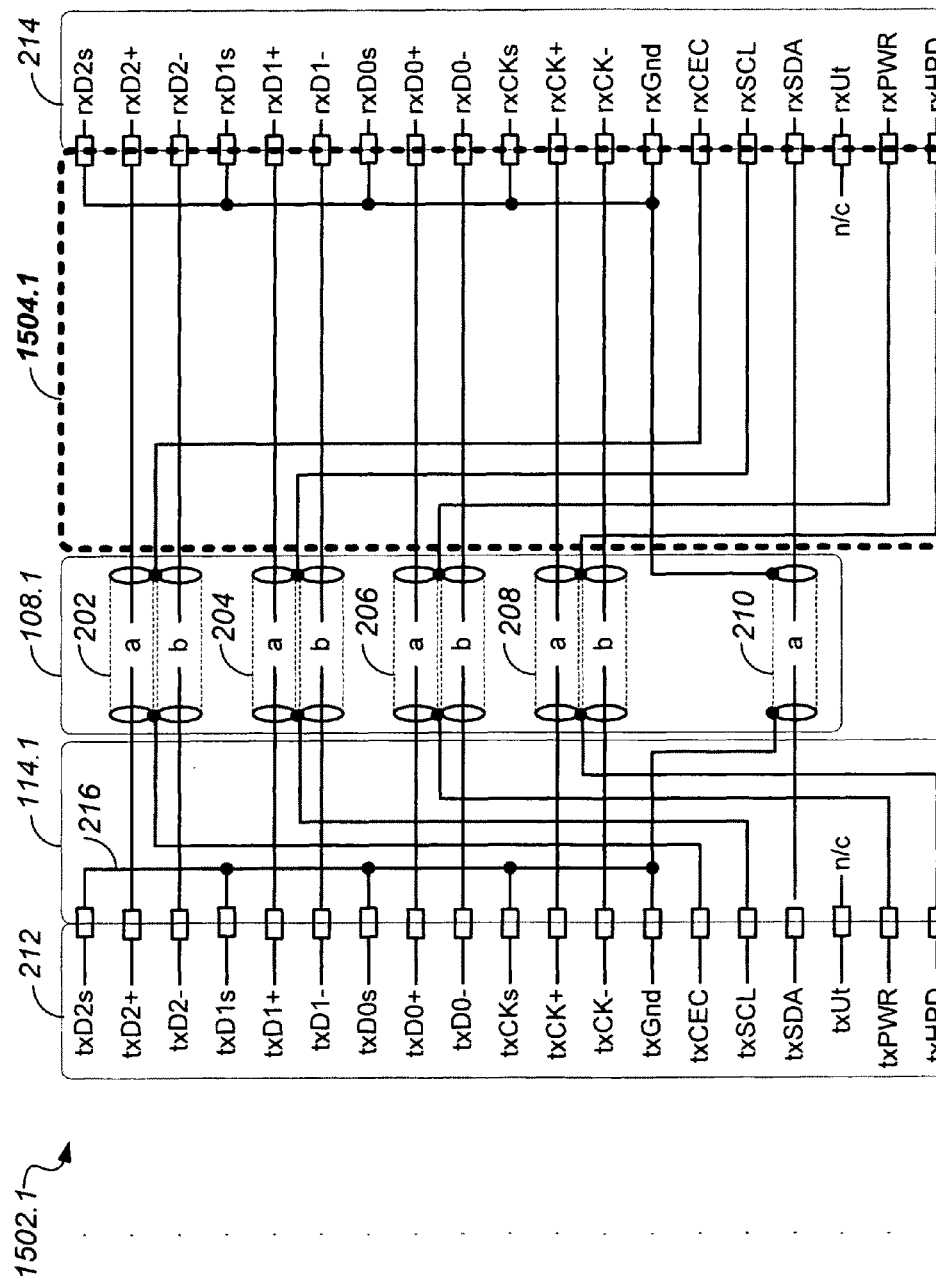
FIG. 16 shows a Basic Unboosted Coax HDMI Cable 1502.1 based on coax technology according to an embodiment of the invention, including the Input Connection Field 212, the first Input Paddle Board 114.1, the first Raw Cable 108.1, the Output Connection Field 214, as well as a first Unboosted Output Paddle Board 1504.1.

FIG. 16 shows a Basic Unboosted Coax HDMI Cable 1502.1 based on coax technology according to an embodiment of the invention, including the Input Connection Field 212, the first Input Paddle Board 114.1, the first Raw Cable 108.1, the Output Connection Field 214, as well as a first Unboosted Output Paddle Board 1504.1.

Figure 17:
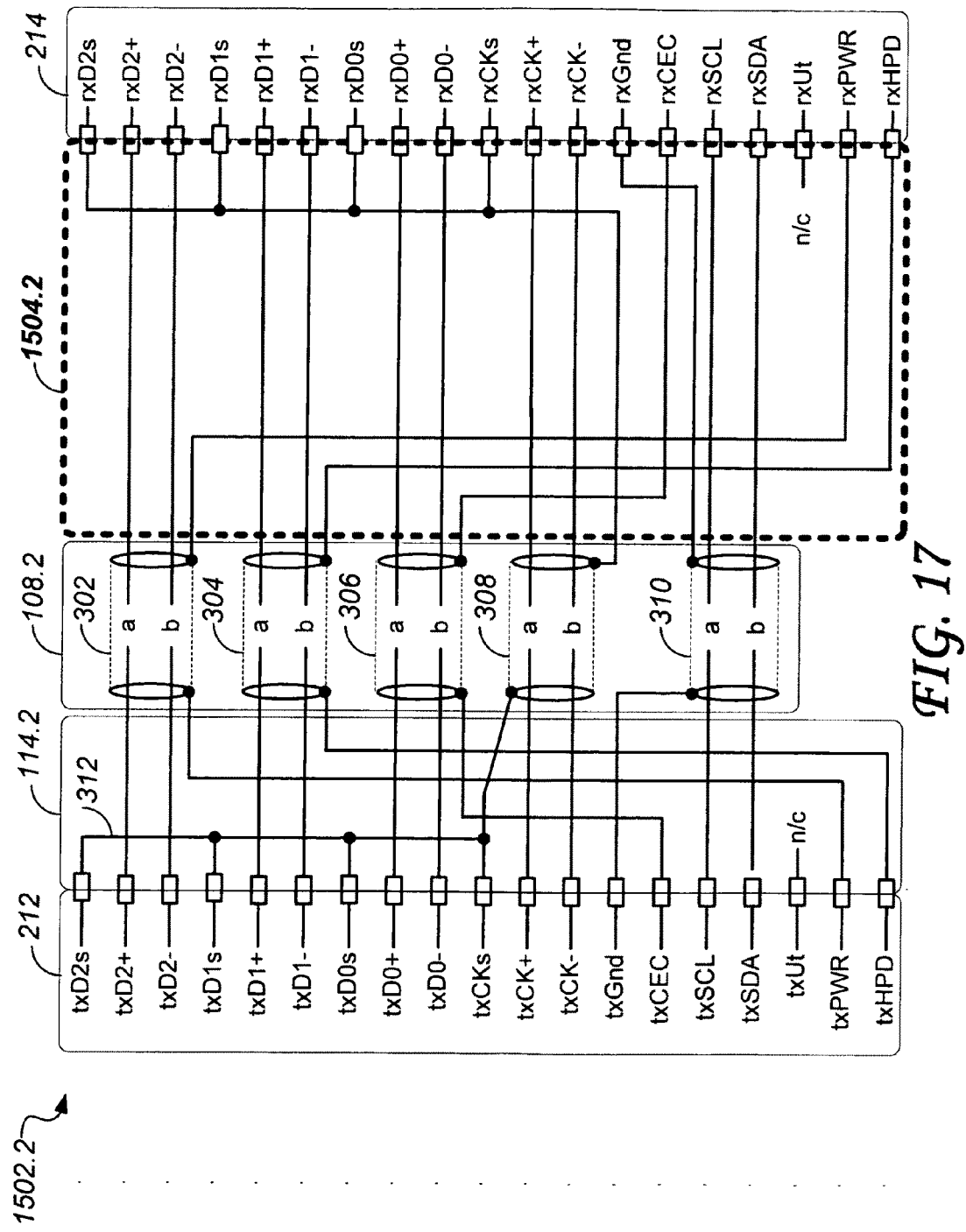
FIG. 17 shows a Basic Unboosted STP HDMI Cable 1502.2 based on Shielded Twisted Pair (STP) technology according to an embodiment of the invention, including the Input Connection Field 212, the second Input Paddle Board 114.2, the second Raw Cable 108.2, the Output Connection Field 214, as well as a second Unboosted Output Paddle Board 1504.2.

FIG. 17 shows a Basic Unboosted STP HDMI Cable 1502.2 based on Shielded Twisted Pair (STP) technology according to an embodiment of the invention, including the Input Connection Field 212, the second Input Paddle Board 114.2, the second Raw Cable 108.2, the Output Connection Field 214, as well as a second Unboosted Output Paddle Board 1504.2.

Figure 18:
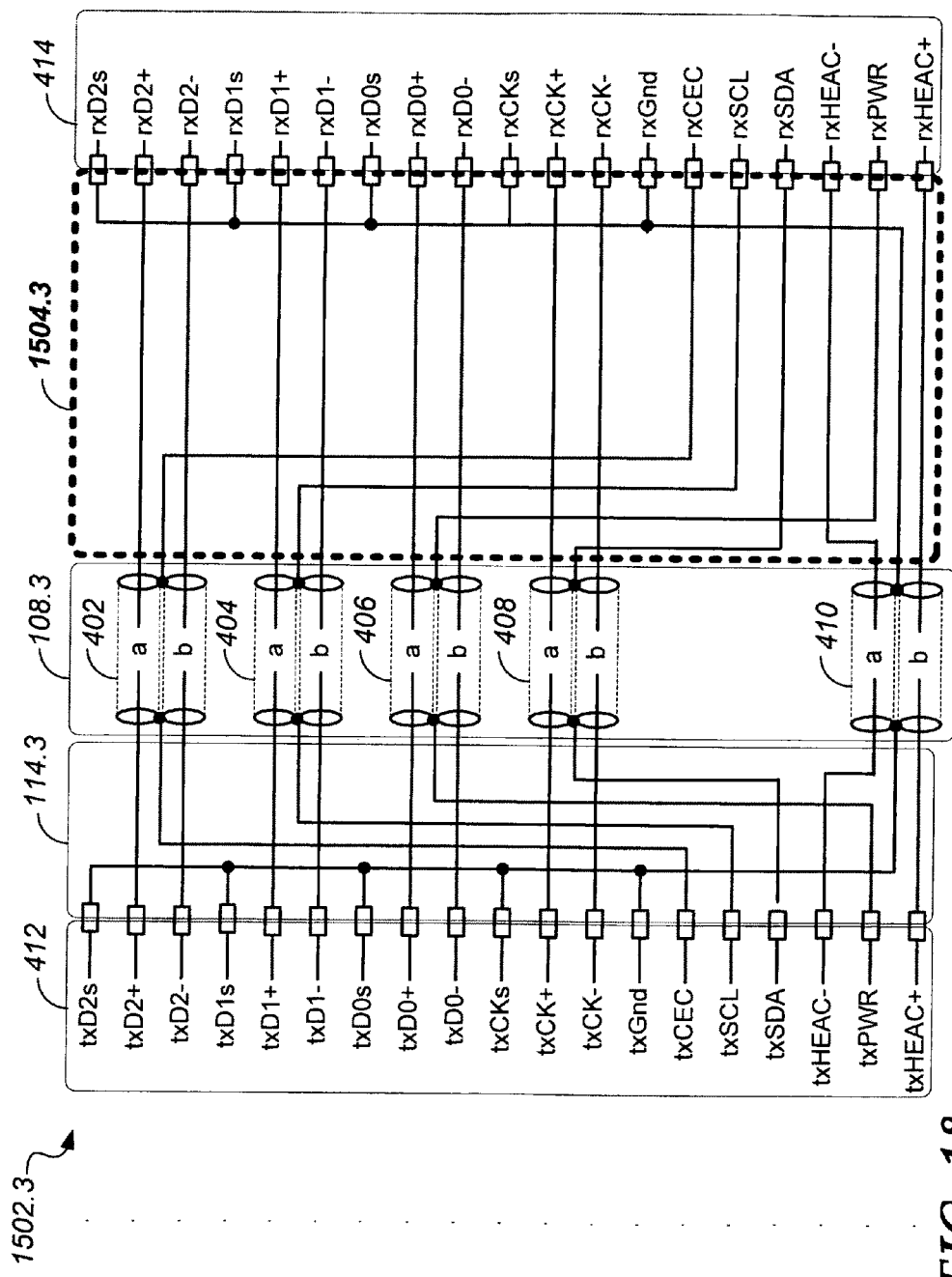
FIG. 18 shows an Unboosted HEAC-Capable Coax HDMI Cable 1502.3 based on coax technology according to an embodiment of the invention, including the HEAC-capable Input Connection Field 412, the third Input Paddle Board 114.3, the third Raw Cable 108.3, the HEAC-capable Output Connection Field 414, as well as a third Unboosted Output Paddle Board 1504.3.

FIG. 18 shows an Unboosted HEAC-Capable Coax HDMI Cable 1502.3 based on coax technology according to an embodiment of the invention, including the HEAC-capable Input Connection Field 412, the third Input Paddle Board 114.3, the third Raw Cable 108.3, the HEAC-capable Output Connection Field 414, as well as a third Unboosted Output Paddle Board 1504.3.

Figure 19:
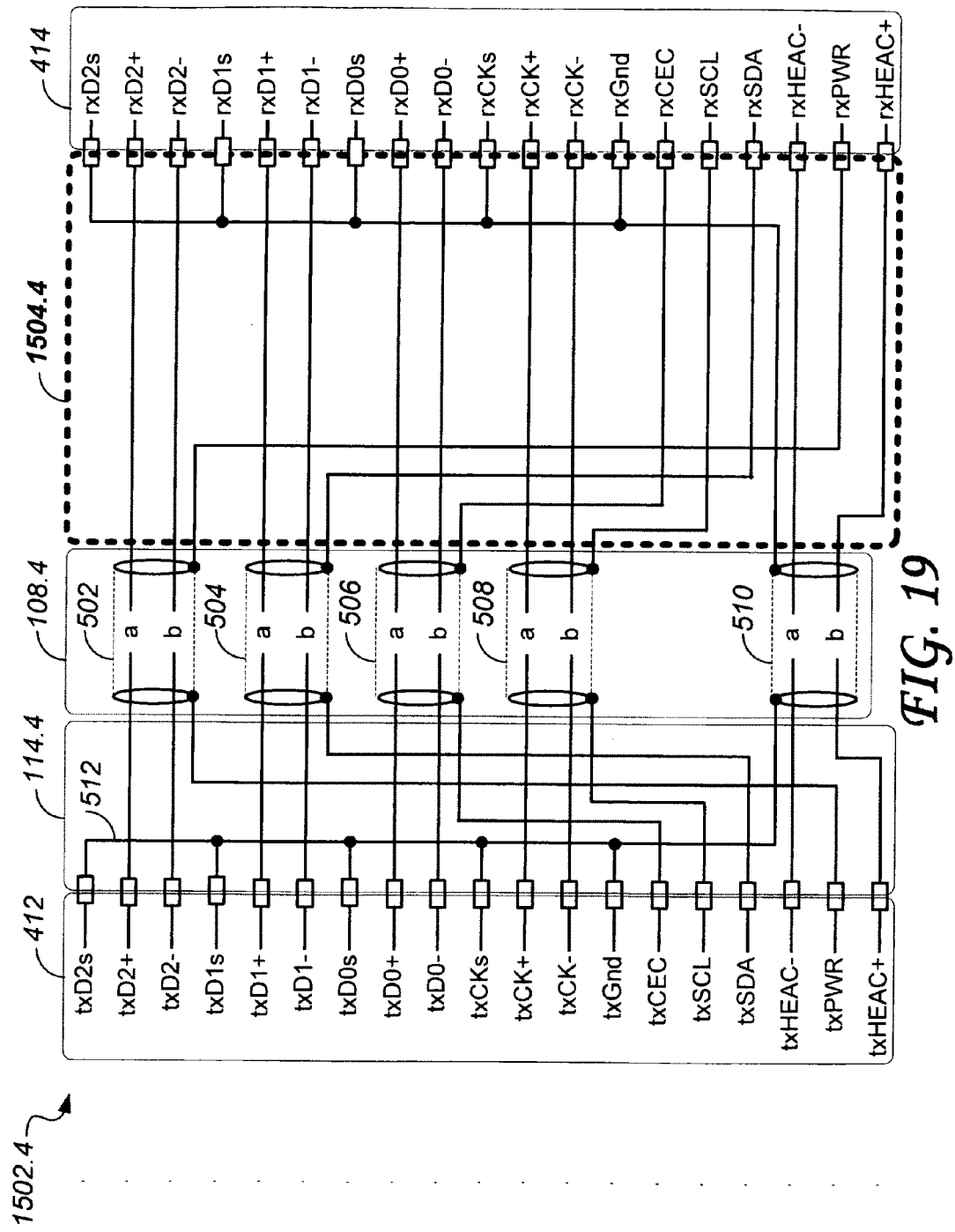
FIG. 19 shows an Unboosted HEAC-Capable STP HDMI Cable 1502.4 based on Shielded Twisted Pair (STP) technology according to an embodiment of the invention, including the HEAC-capable Input Connection Field 212, the fourth Input Paddle Board 114.4, the fourth Raw Cable 108.4, the HEAC-capable Output Connection Field 214, as well as a fourth Unboosted Output Paddle Board 1504.4.

FIG. 19 shows an Unboosted HEAC-Capable STP HDMI Cable 1502.4 based on Shielded Twisted Pair (STP) technology according to an embodiment of the invention, including the HEAC-capable Input Connection Field 212, the fourth Input Paddle Board 114.4, the fourth Raw Cable 108.4, the HEAC-capable Output Connection Field 214, as well as a fourth Unboosted Output Paddle Board 1504.4.

Figure 20:
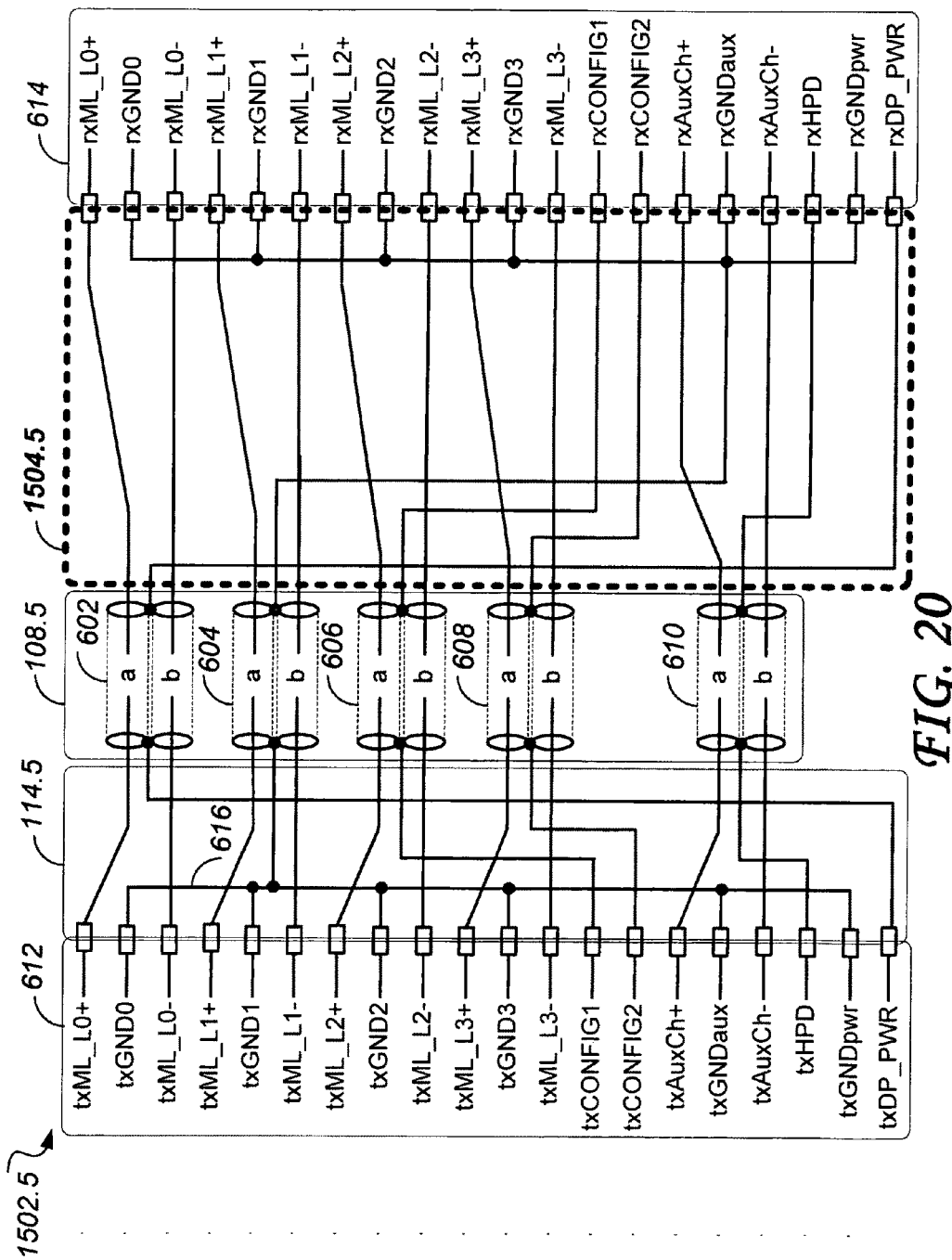
FIG. 20 shows an Unboosted Coax DisplayPort Cable 1502.5 based on coax technology according to an embodiment of the invention, including the DisplayPort Input Connection Field 612, the fifth Input Paddle Board 114.5, the fifth Raw Cable 108.5, the DisplayPort Output Connection Field 614, as well as a fifth Unboosted Output Paddle Board 1504.5.

FIG. 20 shows an Unboosted Coax DisplayPort Cable 1502.5 based on coax technology according to an embodiment of the invention, including the DisplayPort Input Connection Field 612, the fifth Input Paddle Board 114.5, the fifth Raw Cable 108.5, the DisplayPort Output Connection Field 614, as well as a fifth Unboosted Output Paddle Board 1504.5.

Figure 21:
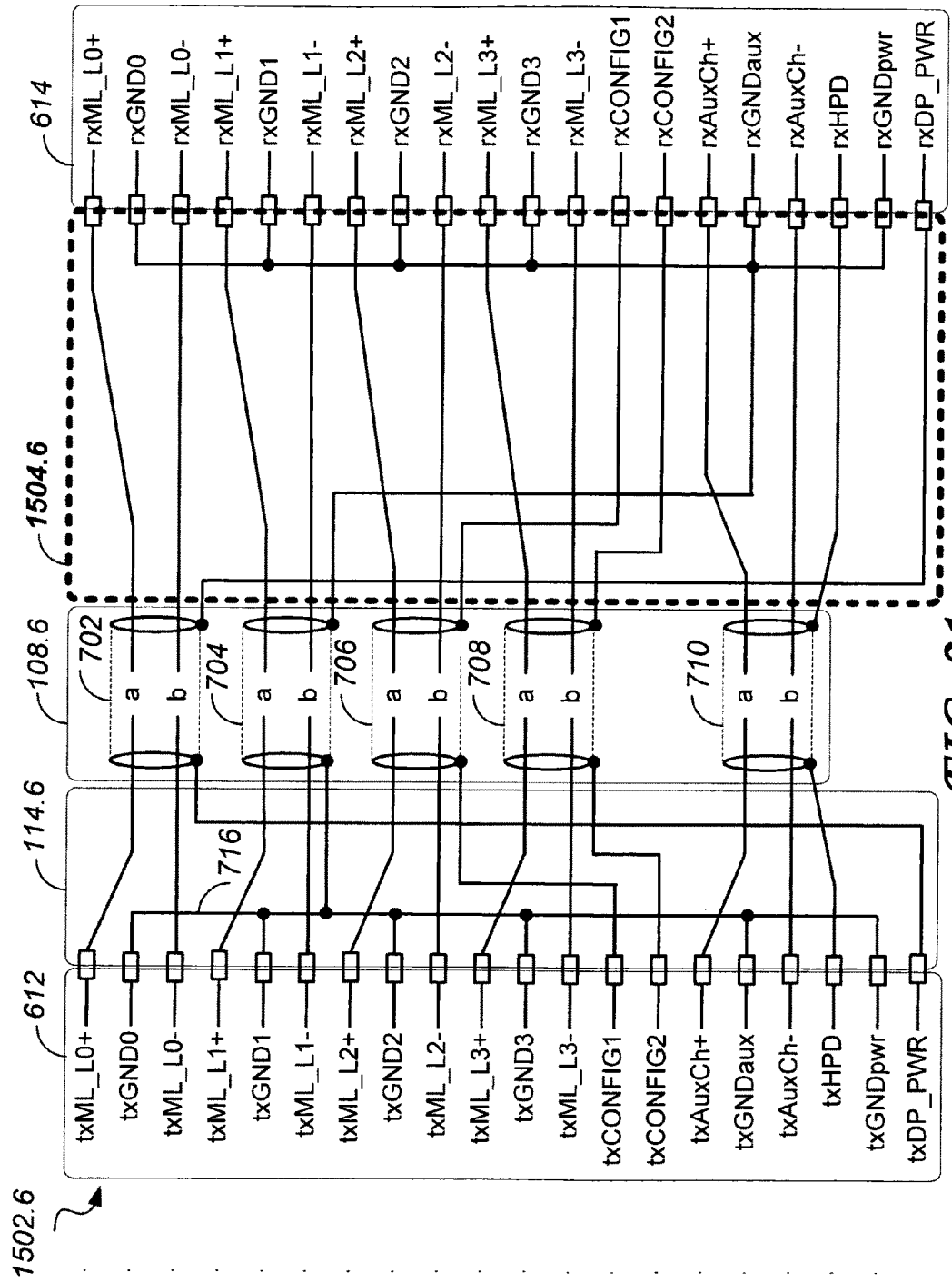
FIG. 21 shows an Unboosted STP DisplayPort Cable 1502.6 based on Shielded Twisted Pair (STP) technology according to an embodiment of the invention, including the DisplayPort Input Connection Field 612, the sixth Input Paddle Board 114.6, the sixth Raw Cable 108.1, the DisplayPort Output Connection Field 614, as well as a sixth Unboosted Output Paddle Board 1504.6.

FIG. 21 shows an Unboosted STP DisplayPort Cable 1502.6 based on Shielded Twisted Pair (STP) technology according to an embodiment of the invention, including the DisplayPort Input Connection Field 612, the sixth Input Paddle Board 114.6, the sixth Raw Cable 108.1, the DisplayPort Output Connection Field 614, as well as a sixth Unboosted Output Paddle Board 1504.6.

Figure 22:
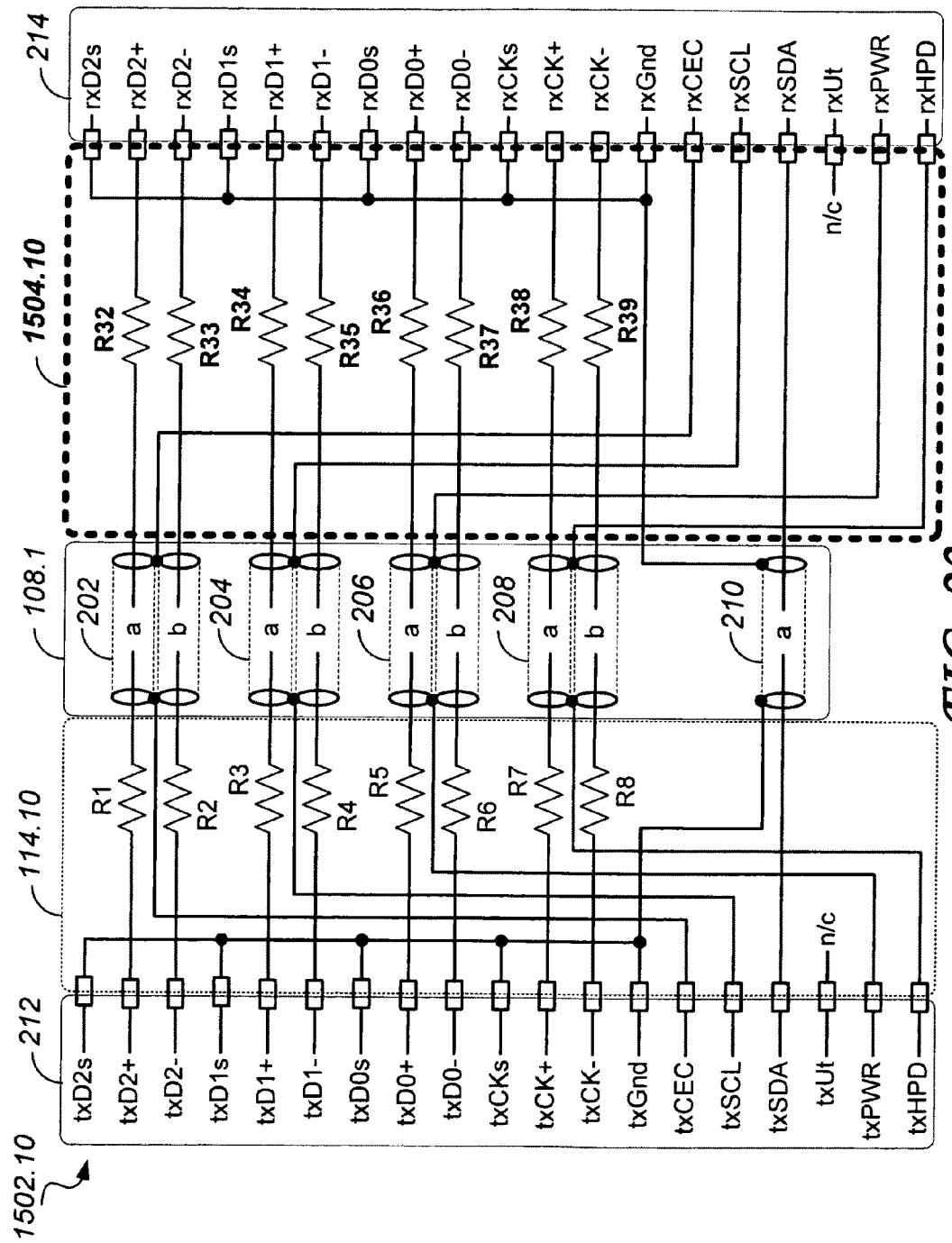
FIG. 22 shows an Unboosted Low-Impedance Coax HDMI Cable 1502.10 which is identical to the Basic Unboosted Coax HDMI Cable 1502.1 of FIG. 16 except for the Low-Impedance Input Paddle Board 114.10 instead of the first Input Paddle Board 114.1, and includes the Input Connection Field 212, the first Raw Cable 108.1, the Output Connection Field 214, as well as a Low-Impedance Unboosted Output Paddle Board 1504.10.

FIG. 22 shows an Unboosted Low-Impedance Coax HDMI Cable 1502.10 which is identical to the Basic Unboosted Coax HDMI Cable 1502.1 of FIG. 16 except for the Low- Impedance Input Paddle Board 114.10 instead of the first Input Paddle Board 114.1, and includes the Input Connection Field 212, the first Raw Cable 108.1, the Output Connection Field 214, as well as a Low-Impedance Unboosted Output Paddle Board 1504.10.

The Low-Impedance Unboosted Output Paddle Board 1504.10 includes padding resistors R32 to R39 which correspond to the padding resistors R1 to R8 of the Low-Impedance Input Paddle Board 114.10 and in combination with a low-impedance raw cable provide the correct nominal cable impedance at the cable connectors according to the HDMI specification.

Figure 23:
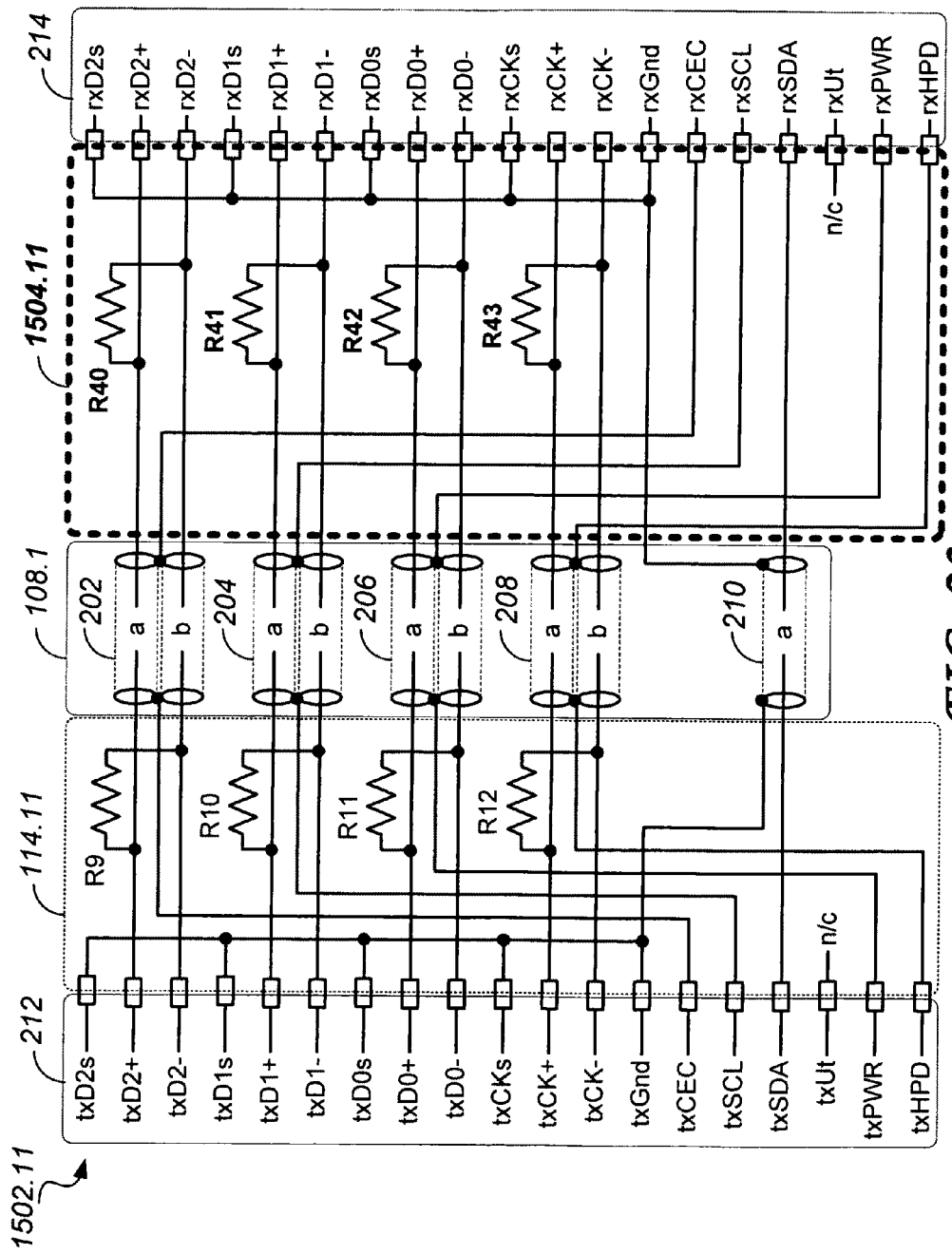
FIG. 23 shows an Unboosted High-Impedance Coax HDMI Cable 1502.11 which is identical to the Basic Unboosted Coax HDMI Cable 1502.1 of FIG. 16 except for the High-Impedance Input Paddle Board 114.11 instead of the first Input Paddle Board 114.1, and includes the Input Connection Field 212, the first Raw Cable 108.1, the Output Connection Field 214, as well as a High-Impedance Unboosted Output Paddle Board 1504.11.

FIG. 23 shows an Unboosted High-Impedance Coax HDMI Cable 1502.11 which is identical to the Basic Unboosted Coax HDMI Cable 1502.1 of FIG. 16 except for the High-Impedance Input Paddle Board 114.11 instead of the first Input Paddle Board 114.1, and includes the Input Connection Field 212, the first Raw Cable 108.1, the Output Connection Field 214, as well as a High-Impedance Unboosted Output Paddle Board 1504.11.

The High-Impedance Unboosted Output Paddle Board 1504.11 includes shunt resistors R40 to R43 which correspond to the shunt resistors R9 to R12 of the High-Impedance Input Paddle Board 114.10 and in combination with a high-impedance raw cable provide the correct nominal cable impedance at both cable connectors according to the HDMI specification.

Figure 24:
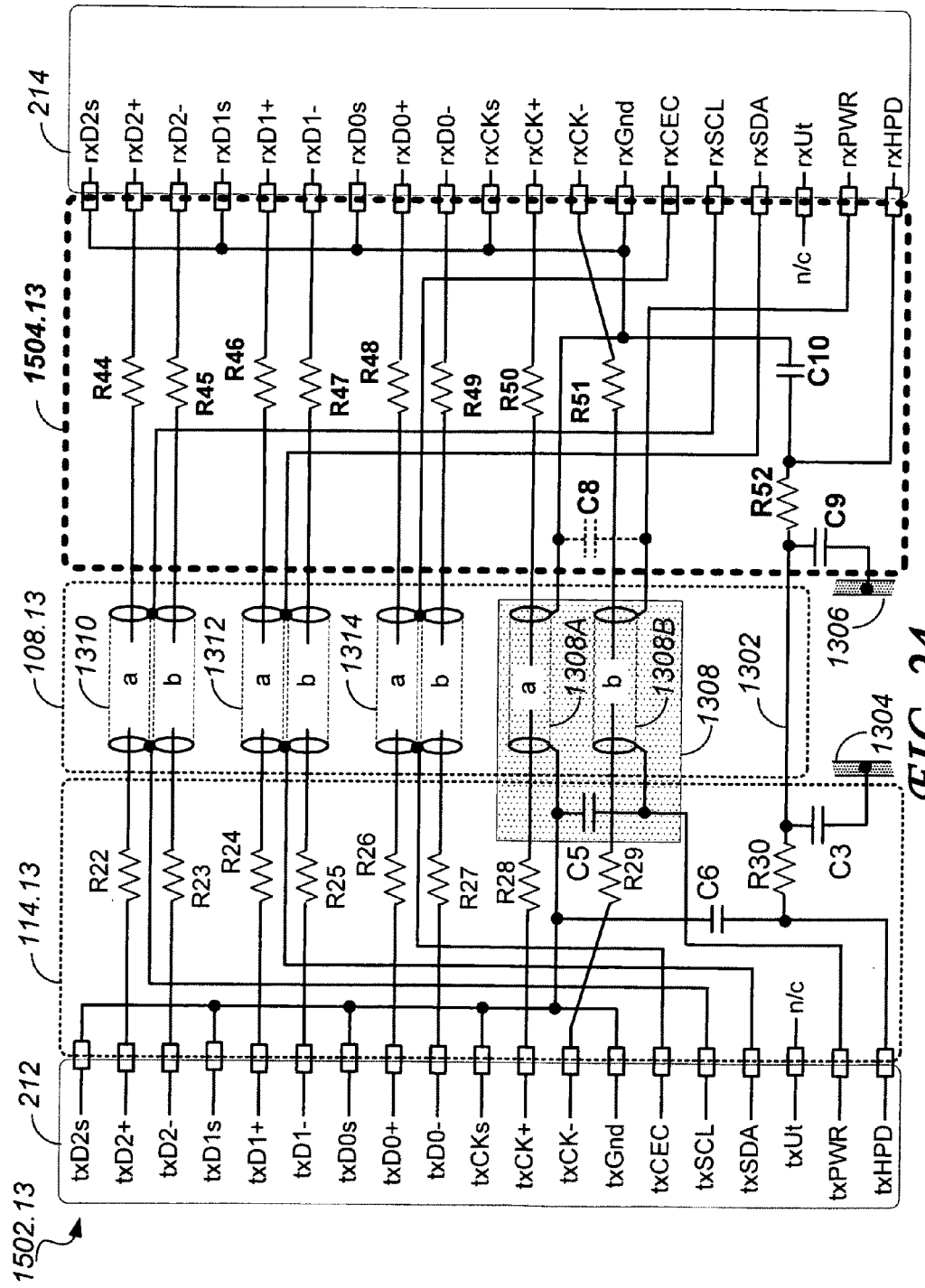
FIG. 24 shows an Unboosted Low-Impedance 8-Coax HDMI Cable 1502.13, including the Input Connection Field 212, the Second 8-Coax Input Paddle Board 114.13, the Second 8-Coax Raw Cable 108.13, the Output Connection Field 214, as well as a Low-Impedance Unboosted Output Paddle Board 1504.13.

FIG. 24 shows an Unboosted Low-Impedance 8-Coax HDMI Cable 1502.13, including the Input Connection Field 212, the Second 8-Coax Input Paddle Board 114.13, the Second 8-Coax Raw Cable 108.13, the Output Connection Field 214, as well as a Low-Impedance Unboosted Output Paddle Board 1504.13.

The Low-Impedance Unboosted Output Paddle Board 1504.13 is similar to the Second 8-Coax Output Paddle Board 116.13 of FIG. 14, but instead of the Boost Device 118 comprises padding resistors R44 to R51 analogous to the padding resistors R22 to R29 of the Second 8-Coax Input Paddle Board 114.13, each padding resistor connected in series between a TMDS high speed data or clock terminal of the Output Connection Field 214 and one of the eight shielded conductors of the dual or split dual shielded cable elements of the Second 8-Coax Raw Cable 108.13.

The Low-Impedance Unboosted Output Paddle Board 1504.13 further includes: an ESD resistor R52 an isolating capacitor C9; and a bypass capacitor C10, these components corresponding to the ESD resistor R31, the isolating capacitor C4 and the bypass capacitor C7 of the Second 8-Coax Output Paddle Board 116.13, for permitting the HDMI HPD signal to be carried over the Metallic Outer Cable Braid 1302 of the Second 8-Coax Raw Cable 108.13.

A large number of cable versions, boosted and unboosted, have been briefly described. Further combinations of the described features may be readily devised, for example cables similar to the Second 8-Coax HDMI Cable 102.13 or the Unboosted Low-Impedance 8-Coax HDMI Cable 1502.13, but employing eight coax lines of the correct (50 ohms) impedance, thus avoiding padding resistors. The use of dual shielded cable elements and a split dual shielded cable element as well as the metallic cable braid permits such a cable to carry to carry 14 HDMI connections. Another example would be a cable of eight high-impedance coax lines, requiring shunt resistors for proper impedance matching when high-impedance coax lines are employed. No padding or shunt resistors are needed when coax lines of the nominal (50 ohms for HDMI) impedance are used.

Although various exemplary embodiments of the invention have been disclosed, it should be apparent to those skilled in the art that various changes and modifications can be made which will achieve some of the advantages of the invention without departing from the true scope of the invention.

For example, the following elements according to various exemplary embodiments of the invention described above may be combined to advantage in applications such as an HDMI cable with or without HEAC capability, a Display Port cable, or similar high speed data cables: boosting of differential signals; carrying an auxiliary signal including power and ground on the common shield of a dual shielded cable element which may be a pair of coaxial lines or a shielded twisted pair; carrying auxiliary signals including power and ground on the individual shields of a split dual shielded cable element; carrying an auxiliary signal including power and ground on the cable braid; using raw cable elements of lower or higher impedance than the impedance specified for the cable, and correcting the impedance with a resistor network (series or shunt resistors respectively); carrying a differential high speed signal through the cable, but retrieving only one polarity of the signal to be subsequently restored at the cable end in a single-ended to differential converter.

A person understanding this invention may now conceive of alternative structures and embodiments or variations of the above all of which are intended to fall within the scope of the invention as defined in the claims that follow.

What is claimed is:

1. A cable for carrying a high speed differential digital data signals and one or more auxiliary signals between a source device and a sink device according to a cable specification, the cable comprising:
   a raw cable, comprising a split dual shielded cable element, comprising two shielded conductors, each of said two shielded conductors being enclosed in an individual shield, wherein the individual shield of the first shielded conductor electrically couples a first auxiliary signal from the source device to the sink device;
   a coupling capacitor capacitively coupling the first individual shield of the split dual shielded cable element to the second individual shield of the split dual shielded cable element; and wherein:
   the shielded conductors of the split dual shielded cable element are designated for carrying the high speed differential digital data signal.

2. The cable of claim 1, wherein capacitance of the coupling capacitor is chosen to be low enough not to cause cross talk between low speed auxiliary signals, but high enough to preserve transmission characteristics of the dual shielded cable element with respect of the high speed differential signal.

3. The cable of claim 1, further comprising a boost device for boosting the high speed differential digital data signals.

4. The cable of claim 1, the raw cable further comprising a dual shielded cable element, comprising two shielded conductors and a common shield;
   wherein:
   the two shielded conductors of the dual shielded cable elements are designated for carrying a respective high speed differential digital data signal; and
   the common shield of the shielded conductors is designated for carrying an additional auxiliary signals.

5. The cable of claim 4, wherein the raw cable comprises only two split dual shielded cable elements, and two dual shielded cable elements, each dual shielded element comprising two shielded conductors and a common shield.

6. The cable of claim 4, wherein the dual shielded cable element is a dual coaxial element, comprising two coaxial lines whose shields are joined, and said shields of each coaxial line enclosing a respective shielded conductor.

7. The cable of claim 1, further comprising a first circuit carrier for connecting the raw cable to the source device, and a second circuit carrier for connecting the raw cable to the sink device.

8. The cable of claim 7, wherein the first circuit carrier comprises:
   terminals for connecting the high speed differential digital data signal from the source device to respective shielded conductors of the split dual shielded cable element; and
   terminals for connecting respective auxiliary signals from the source device to the individual shields respectively.

9. The cable of claim 7, wherein the second circuit carrier comprises:
   terminals for connecting the high speed differential digital data signals from respective shielded conductors of the split dual shielded cable element to the sink device; and
   terminals for connecting respective auxiliary signals from the individual shields to the sink device.

10. The cable of claim 1, wherein capacitance of the coupling capacitor is about 1 nF.

11. The cable of claim 1, wherein the cable specification is a High-Definition Multimedia Interface (HDMI) standard.

12. The cable of claim 1, wherein the individual shields of the split dual shielded cable element are designated for carrying Power and Ground auxiliary signals.

13. The cable of claim 1, wherein the individual shields of the split dual shielded cable element are designated for carrying a Hot Plug Detect (HPD) auxiliary signal and CEC (Consumer Electronics Control) auxiliary signal.

14. The cable of claim 1, wherein the cable specification is a DisplayPort standard.

15. The cable of claim 1, wherein said split dual shielded cable element is a split dual coaxial element, comprising two coaxial lines whose shields are capacitively coupled to one another, and each coaxial line enclosing one shielded conductor.

16. A method for transmitting a high speed differential digital data signal and one or more auxiliary signals between a source device and a sink device according to a cable specification over a cable extending between the source device and the sink device, the method comprising:
   carrying the high speed differential digital data signal over the cable in two shielded conductors of a split shielded cable element, each of the two shielded conductors having an individual shield;
   capacitively coupling the individual shields of the split dual shielded cable element through a coupling capacitor; and
   carrying said one or more auxiliary signals on respective individual shields of the shielded conductors.

17. The method of claim 16, further comprising carrying yet another auxiliary signal on a common shield of a dual shielded cable element comprising two shielded conductors and the common shield.

18. The method of claim 16, wherein the carrying is performed according to the cable specification, which is a High Definition Multimedia Interface (HDMI) standard or a DisplayPort standard.

* * * * *